US007843615B2

(12) United States Patent
Jooste et al.

(10) Patent No.: US 7,843,615 B2
(45) Date of Patent: Nov. 30, 2010

(54) METHOD OF MATCHING A DIGITAL PRINTING PRESS WITH THE COLOR CHARACTERISTICS OF A PLATE-BASED PRESS PLATFORM

(75) Inventors: Jeffrey P. Jooste, Fox Island, WA (US); Bobby Lynn Pruitt, Reidsville, NC (US)

(73) Assignee: Avery Dennison Corporation, Pasadena, CA (US)

( * ) Notice: Subject to any disclaimer, the term of this patent is extended or adjusted under 35 U.S.C. 154(b) by 760 days.

(21) Appl. No.: 11/811,278

(22) Filed: Jun. 8, 2007

(65) Prior Publication Data

US 2008/0000367 A1 Jan. 3, 2008

Related U.S. Application Data

(63) Continuation-in-part of application No. 11/607,455, filed on Dec. 1, 2006, now Pat. No. 7,540,414.

(60) Provisional application No. 60/812,576, filed on Jun. 8, 2006, provisional application No. 60/741,361, filed on Dec. 1, 2005, provisional application No. 60/779,555, filed on Mar. 6, 2006.

(51) Int. Cl.
    *H04N 1/46* (2006.01)
(52) U.S. Cl. ......................... 358/504; 358/1.9; 358/518; 358/523; 382/162; 382/167; 101/211; 101/484
(58) Field of Classification Search ....................... None
See application file for complete search history.

(56) References Cited

U.S. PATENT DOCUMENTS 5,841,955 A * 11/1998 Wang .......................... 358/1.9

| 6,008,907 | A  | * | 12/1999 | Vigneau et al. | 358/1.9 |
|---|---|---|---|---|---|
| 6,722,281 | B2 | * | 4/2004 | Yamamoto | 101/484 |
| 7,002,614 | B2 | * | 2/2006 | Iannazzi | 347/240 |
| 2002/0162470 | A1 | * | 11/2002 | Shimamura | 101/484 |
| 2003/0156299 | A1 | * | 8/2003 | Martinez et al. | 358/1.9 |
| 2003/0217662 | A1 | * | 11/2003 | Koifman et al. | 101/484 |
| 2004/0233463 | A1 | * | 11/2004 | Hersch et al. | 358/1.9 |
| 2005/0099431 | A1 | * | 5/2005 | Herbert et al. | 345/601 |
| 2005/0150411 | A1 | * | 7/2005 | Bestmann | 101/484 |

FOREIGN PATENT DOCUMENTS

EP     0584019 A2    2/1994

* cited by examiner

*Primary Examiner*—Mark K Zimmerman
*Assistant Examiner*—Miya J Cato
(74) *Attorney, Agent, or Firm*—Kriegsman & Kriegsman

(57) ABSTRACT

A method of managing the production of tickets in accordance with a ticket order submitted to a ticketing services bureau by a customer includes an optional step of producing a physical ticket proof for the customer prior to execution of the ticket order. Preferably, the physical ticket proof is generated using a plateless printing press, such as a digital printing press, but has the print characteristics of a particular plate-based press platform which is designated to execute the ticket order. A process for accurately matching the color characteristics of the digital printing press with the color characteristics of a plate-based press platform includes the steps of calibrating the plate-based press platform to meet a particular printing standard, creating an International Color Consortium (ICC) profile for the designated plate-based press platform, applying the ICC profile to the digital printing press, and managing the color formulation properties of the digital printing press.

10 Claims, 18 Drawing Sheets

METHOD OF MATCHING A DIGITAL PRINTING PRESS WITH THE COLOR CHARACTERISTICS OF A PLATE-BASED PRESS PLATFORM

CROSS-REFERENCE TO RELATED APPLICATIONS

The present application claims the benefit under 35 U.S.C. 119(e) of U.S. provisional Patent Application Ser. No. 60/812,576, filed Jun. 8, 2006, the disclosure of which is incorporated herein by reference. The present application is a also continuation-in-part of U.S. patent application Ser. No. 11/607,455, filed Dec. 1, 2006 now U.S. Pat. No. 7,540,414 which, in turn, claims the benefit under 35 U.S.C. 119(e) of U.S. provisional Patent Application Ser. No. 60/741,361, filed Dec. 1, 2005 and U.S. provisional Patent Application Ser. No. 60/779,555, filed Mar. 6, 2006, the disclosure of all of said applications being incorporated herein by reference.

BACKGROUND OF THE INVENTION

The present invention relates generally to the retail industry and more particularly to ticketing services in the retail industry.

An article of commerce is typically delivered from a supplier (e.g., a brand owner or vendor) to a buyer (e.g., a retailer) through a multi-stepped process which is commonly referred to in the art as the retail supply chain. Specifically, referring now to FIG. 1, there is shown a simplified block diagram of one common version of the retail supply chain, the retail supply chain being identified generally by reference numeral 11. In the first step of supply chain 11, a retailer 13 places a purchase order (i.e., an order to purchase product at a specified price) with a supplier 15, the purchase order placement step being represented generally by arrow 17. In response thereto, supplier 15 instructs a manufacturing facility 19 (e.g., a factory) to manufacture the particular product for purchase in accordance with the purchase order, the instruction step being identified generally by arrow 21.

In the retail industry, articles of commerce (as well as their corresponding shipping cartons) are traditionally provided with one or more forms of identification media (also referred to herein simply as tags, tickets or labels) to communicate pertinent information relating to the articles. For example, an article of clothing is commonly provided with a permanent label, fabric label or a woven label which may inform a consumer of, among other things, the name of the manufacturer and/or instructions for washing the article. As another example, an article of clothing is commonly provided with a removable price tag which is designed for separation from the article after purchase, the removable tag informing a consumer of, among other things, the price, size and style of the article at the point-of-sale. As yet another example, a carton (or other similar type of shipping container) is often provided with an adhesive-backed label to display, inter alia, pertinent shipping information relating to the carton as well as information relating to the contents contained therein. It is to be understood that use of the terms "tags", "tickets" and "labels" are used interchangeably herein and are meant to encompass all well-known forms of identification media.

Accordingly, it should be noted that, as part of step 21, supplier 15 may additionally instruct manufacturing facility 19 to manufacture any tickets that are to be used in conjunction with the manufactured articles, such as shipping labels, price tags, etc. (In the present patent application, references to "manufacturing" and "production" of tags, labels or tickets signify the imprinting and/or encoding of these media, not the fabrication of the media.). However, as can be appreciated, the production costs associated with the printing, sorting, packing and shipping of individual labels (e.g., labor, equipment and facilities) are often too large for a product manufacturing facility to absorb. As a result, many retail companies often out-source either a portion or all of their ticketing services to a specialist in the ticketing industry. Avery Dennison Corporation of Pasadena, Calif., is widely regarded as an innovator and pioneer in the retail ticketing services industry. TICKET EXPRESS™, which is a well-known retail ticketing service presently commercialized by Avery Dennison Corporation, utilizes a network-based ticketing system to promote efficient and accurate ticket production and management services.

As a result, if manufacturing facility 19 is not suitably equipped to meet the ticketing demands of the purchase order, the ticketing services may be alternatively directed to a ticketing service bureau 23 that specializes in retail ticketing services (e.g., Avery Dennison Corporation's TICKET EXPRESS™ retail ticketing service bureau). It is to be understood that the ticket request placed with ticketing services bureau 23 is typically placed by either supplier 15 (as represented by arrow 25 in FIG. 1), manufacturing facility 19 (as represented by arrow 26-1 in FIG. 1) or retailer 13 (as represented by arrow 26-2 in FIG. 1).

Having received the ticketing requests for the purchase order, ticketing service bureau 23 instructs an affiliated print center 26 to generate all the necessary tickets for the purchase order, the ticket generation instruction being represented generally by arrow 27. In the present example, the affiliated print center 26 is located at manufacturing facility 19. However, it is to be understood that print center 26 may alternatively be located anywhere outside of manufacturing facility 19.

Traditionally, tickets are mass-produced at an affiliated print center 26 using plate-based commercial printing presses, such as (e.g., offset printing presses, flexographic printing presses, etc.). Specifically, a plate-based commercial printing press employs one or more imaging plates (i.e., plates with a raised image provided on its outer surface) to transfer one or more layers of colored ink onto the ticket substrate in a particular pattern, whereby each imaging plate is typically designed for use with a particular color (e.g., cyan, magenta, yellow and black). Together, the various imaging plates are used to transfer one or more layers of colored ink onto the ticket substrate in such a manner so as to accurately represent the desired printed ticket. Although well-known and widely used in the art, plate-based commercial printers require that each of the various imaging plates be produced during a pre-press production step which is both costly and time-consuming in nature. As a result, plate-based commercial printers are designed principally for use in conjunction with relatively large, high-speed printing runs and, as such, afford limited ticket variability.

Once printed, the manufactured tickets are then directed to the packing/shipping warehouse for manufacturing facility 19 where the tickets are affixed to the products or product cartons for sale. At this time, manufacturing facility 19 carries out its product packing process.

The packaged articles are then transferred from manufacturing facility 19 to a freight consolidator 29 for shipment, this transfer step being identified generally by arrow 31. In compliance with the purchase order, consolidator 29 then ships the packaged articles to a specified retailer distribution center 33 (e.g., a retailer warehouse) in the most efficient and economically advantageous manner, as represented generally by arrow 35 in FIG. 1. The packaged articles are then delivered from distribution center 33 to retailer 13, the delivery step being generally identified by reference numeral 37. At this stage, if necessary, the package is opened at distribution center 33 and the particular product requested may be delivered (e.g., as part of a smaller package). Once received at retailer 13, the product is then displayed for sale, thereby completing the closed-loop supply chain cycle.

As noted above, TICKET EXPRESS™ is a well-known retail ticketing service bureau which utilizes a network-based ticketing system to promote efficient and accurate ticket production and management services. Although well-known and widely used in commerce, most conventional network-based retail ticketing services suffer from a notable shortcoming.

Specifically, most conventional web-based retail ticketing services only provide a client with a ticket proof prior to printing which is generic in nature (i.e., which does not incorporate the variable information of the ticket order therein). As a result, the customer is not able to review an adequate representation of the ticket to be generated as part of the order but rather is only able to review a generic graphic that is akin to an entry in a product catalog. Without having the ability to review an accurate representation of the ticket prior to the ticket printing process, the customer may become dissatisfied with the finished product which, in turn, may necessitate a reprint of the entire ticket order. Because the reprint of a ticket order using a plate-based printing press requires the production of a new set of imaging plates, a ticket reprint represents a considerable financial expense and, as a result, is avoided to the greatest extent possible.

Accordingly, applicant has recognized that a specific benefit can be recognized by providing customers of web-based retail ticketing services with ticket proofs which accurately represent the ticket that will be generated. As a result, the customer can actively participate in the design of the ticket prior to completion of the ticket printing process, which is a principal object of the present invention.

SUMMARY OF THE INVENTION

It is an object of the present invention to provide a new and improved method for managing the production of tickets in accordance with a ticket order submitted to a ticketing services bureau by a customer.

It is another object of the present invention to provide a method of the type described above which allows for the production of a physical ticket proof for the customer prior to execution of the ticket order.

It is yet another object of the present invention to provide a method of the type described above wherein the physical ticket proof has the print characteristics of the particular plate-based printing press which will be used to execute the ticket order.

It is yet still another object of the present invention to provide a method of the type described above wherein the physical ticket proof is generated using a plateless printing press, such as a digital printing press.

It is even still another object of the present invention to provide a method of the type described above wherein the physical ticket proof generated by the plateless printing press accurately matches the print characteristics (e.g., color) of the plate-based printing press.

Accordingly, there is provided a method of matching a digital printing press with the color characteristics of a plate-based press platform, the method comprising the steps of (a) calibrating the plate-based press platform to meet a particular printing standard, (b) creating an International Color Consortium (ICC) profile for the designated plate-based press platform, (c) applying the ICC profile to the digital printing press, and (d) managing the color formulation properties of the digital printing press.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 1:
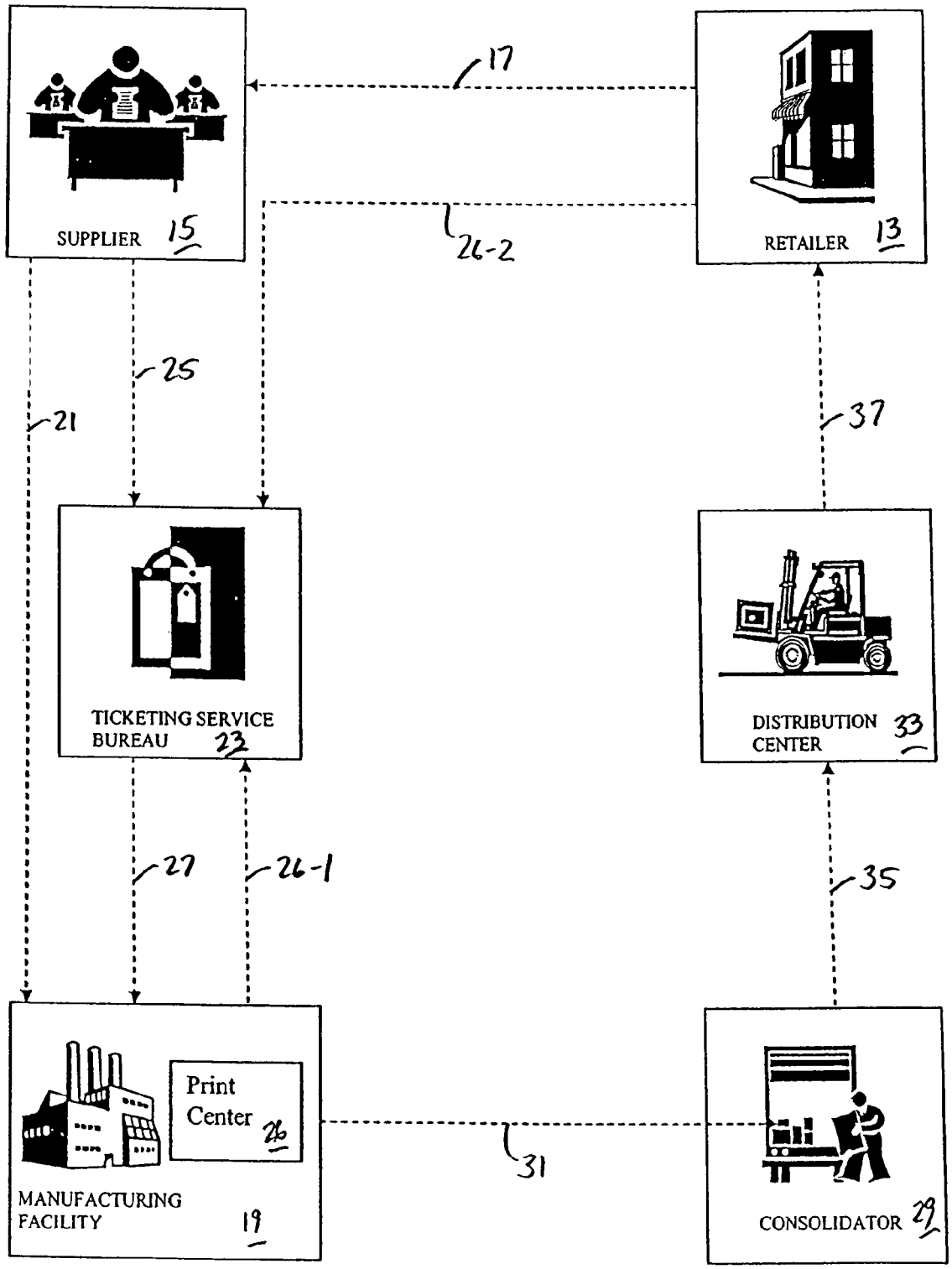
FIG. 1 is a simplified block diagram of a prior art version of the retail supply chain.
Figure 2:
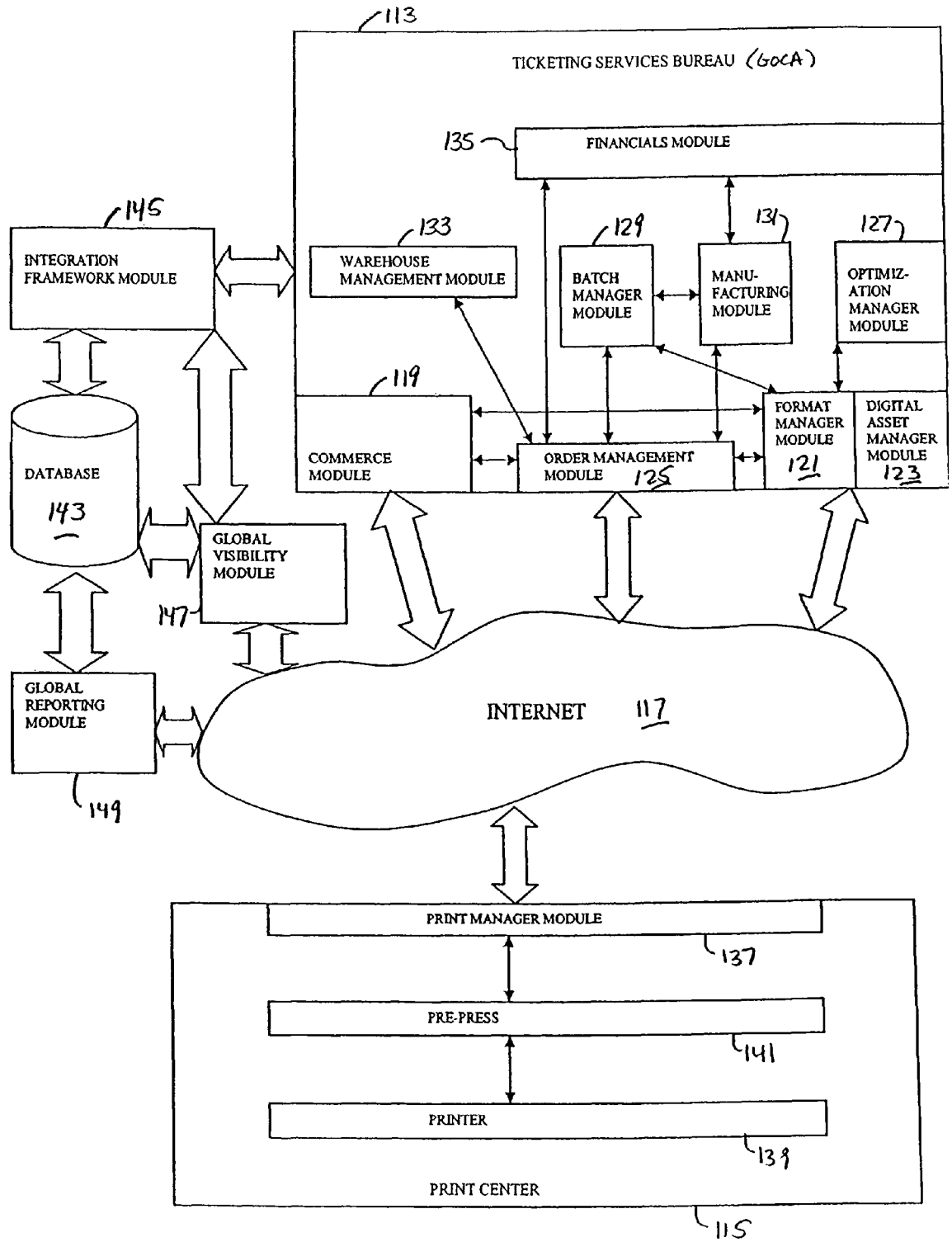
FIG. 2 is a schematic representation of a novel system for production of tickets for use in conjunction with the retail supply chain, the system being constructed according to the teachings of the present invention.

Referring now to FIG. 2, there is shown a detailed block diagram of a system for use in the production of tickets for supply chain articles of commerce, the ticketing system being identified generally by reference numeral 111.

Ticketing system 111 comprises a ticketing services bureau 113 which is electronically linked with at least one print center 115 via the internet 117 (or any other similar communication network). As will be described in detail below, ticketing services bureau 113 is designed to receive a ticket order (i.e., an order for the manufacture of customer-designed tickets) and, in turn, manage the production of said tickets in compliance with the ticket order.

It should be noted that ticketing system 111 is described herein in conjunction with the manufacture of tickets that are to be affixed to articles of commerce. However, it should be noted that ticketing system 111 is not limited to the management of the production of tickets that are to be affixed to articles of commerce. Rather, it is to be understood that ticketing system 111 could be used in conjunction with the management of the production of any printed item without departing from the spirit of the present invention.

It is to be understood that use of the term "tickets" in conjunction with system 111 is meant to encompass any well-known form of identification media that is provided with printed matter. In particular, system 111 is designed for use with either of the two following paradigms of identification media: (1) identification media with relatively standardized formatting attributes (e.g., font type, font size, printed matter layout, etc.), such as conventional price tickets and shipping labels, and (2) identification media with relatively unique formatting attributes, such as fabric labels or other similar types of media which allow for the customer to implement item-specific design characteristics thereto.

With respect to the first paradigm of identification media, it is to be understood that system 111 enables a customer to interactively modify non-stylistic attributes associated with a ticket, such as size, style, price, description code, country of origin, etc. However, the customer is not able to interactively modify stylistic attributes associated with a ticket, such as font type and/or font size, which are typically "givens" for a particular ticket type (e.g., conventional price tickets).

With respect to the second paradigm of identification media, it is to be understood that system 111 enables a customer to interactively modify most or all attributes associated with a ticket including, inter alia, the stylistic attributes associated with a ticket, such as font characteristics (e.g., font, type, font size, bold/italic/underline, scale, etc.) and layout (e.g., rotation, margins, field positioning, etc.).

It should also be noted that ticketing system 111 is represented herein as comprising a single print center 115 for purposes of simplicity only. In fact, it is to be understood ticketing system 111 preferably includes a plurality of print centers 115, wherein each print center 115 can be provided with a broad range of printing capabilities. For example, each print center 115 preferably provides at least some of the following capabilities: digital printing capabilities, thermal printing capabilities, flexographic printing capabilities and offset printing capabilities. In this manner, ticketing services bureau 113 can select the appropriate print center 115 to execute the print order based on the geographic distribution of print orders (i.e., by locating the print center 115 closest to manufacturing facility 19), as will be described in greater detail below. The selection of a print center 115 to execute the print order also can take into account the printing capabilities of different print centers.

Ticketing services bureau 113 is a global ticket order management system and, as a consequence, is also referred to herein simply as a global order capture application (GOCA). GOCA 113 includes a plurality of modules for carrying out its various functions, each module including a collection of routines that perform a system-level function that may be dynamically loaded and unloaded from a running kernel as required. Preferably, GOCA 113 is designed to have an open architecture so as to allow for the addition, removal and/or replacement of the various individual modules as deemed necessary.

Specifically, GOCA 113 comprises a commerce module 119, a format manager module 121, a digital asset manager module 123, an order management module 125, an optimization manager module 127, a batch manager module 129, a manufacturing module 131, a warehouse management module 133 and a financials module 135. The details of each module will be described further in detail below.

Commerce module 119 is preferably run through an International Business Machines, Inc., WebSphere™ Commerce server and is responsible for, among other things, providing a means for supply chain clients as well as internal users (e.g., customer service personnel for the ticketing services bureau) to interface with GOCA 113. In this capacity, commerce module 119 effectively serves as an e-commerce storefront for ticketing services bureau 113. It should be noted that commerce module 119 is preferably designed to allow for the rapid development and deployment of new software to facilitate in the ordering process as well as to create customer-specific stores that can be maintained by the customer.

Format manager module 121 is preferably run using a custom Java solution that utilizes print-from-the-web (PFTW) technology. Format manager module 121 is responsible for, among other things, managing the design, layout and editing of the variable information relating to a ticket order (as well as the relationship of the variable information to pre-printed information). Examples of variable information that is commonly found on a ticket include price information, size information, style information and identification codes relating to the product to which the ticket is to be affixed. As will be described further in detail below, format manager module 121 is responsible for generating a web-based proof which (1) can be interactively reviewed and modified by the client, (2) accurately reflects the particular print characteristics of the target printer for the print job, (3) shows the relationship between the static and variable data, and (4) accurately reproduces images on finished tickets including pre-printed graphics and other stock elements, all of these features serving as principal novel features of the present invention.

Digital asset manager module 123 is preferably run through a web-based enterprise application suite for digital asset management, such as InterchangeDigital's Parts 3.0 application suite. Digital asset manager module 123 is responsible for, among other things, the management of tag graphics that are often found on the front of a tag (e.g., artwork, tag design, etc.), Order management module 125 is preferably run using a scalable back-end e-commerce infrastructure solution that provides comprehensive and flexible real-time order management, such as Yantra Corporation's PureCommerce software. Order management module 125 is responsible for, among other things, the overall management of the ticket order received by commerce module 119.

Optimization manager module 127 is preferably a custom Java-based solution that is responsible for, among other things, developing the most space-efficient (i.e., optimized) layout of tags on the substrate (e.g., sheet of paper) on which the tickets are to be printed.

Batch manager module 129 is preferably a scheduling software tool that is responsible for, inter alia, optimizing the production of tickets at a selected manufacturing site by consolidating (i.e., batching) similar orders in production runs.

Manufacturing module 131 is a preferably a business logic software suite (e.g., SyteLine) that is responsible for, inter alia, the print planning operations for GOCA 111, as will be described in detail below.

Warehouse management module 133 is preferably a software application that is responsible for, inter alia, the management of the delivery of manufactured tags to the warehouse facility 19 where, in turn, said tags are affixed to their associated products and packaged in compliance with specified packing instructions.

Financials module 135 is responsible for, inter alia, the management of invoices and related financial documents with respect to the ticket order; module 135 can be a PeopleSoft financials system.

Print center 115 represents one available facility where tickets can be produced. Print center 115 includes a print manager module 137 which is preferably a custom solution that is responsible for, inter alia, managing print streams as well as the one or more printers 139 which are responsible for the actual printing of the tickets. Although print center 115 is represented herein as a single printer 139 for purposes of simplicity only, it is to be understood that each print center 115 is preferably provided with a variety of different printer types, such as thermal printers, laser printers, flexographic printers, offset printers and/or digital printers, each printer having unique printing characteristics. It should be noted that, if print center 115 engages in flexographic and/or offset printing, print center 115 may additionally include a pre-press 141 for generating printing press plates.

Figure 3:
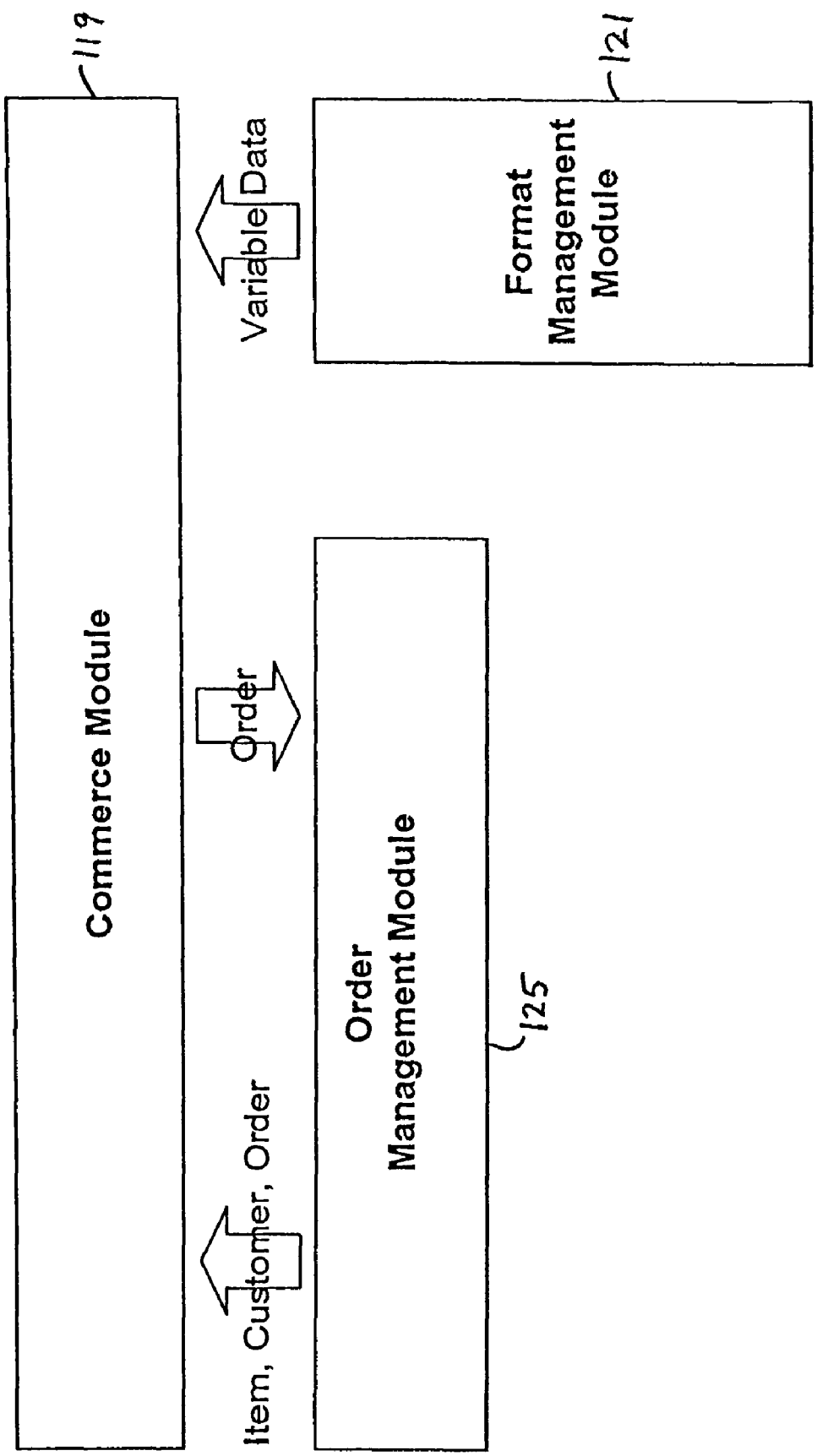
FIG. 3 is a schematic representation of selected modules of the system shown in FIG. 2, the schematic representation being useful in understanding how a ticket order is captured by the ticketing system of the present invention.

As will be described in detail below, system 111 is designed to undertake each of the tasks identified below:

Order Capture (i.e., Commerce Management) relates to the means by which customer systems are bridged, or linked, with GOCA 113. As noted above, commerce module 119 serves as the user interface (both internally and externally) for ticket order capture and, therefore, serves as the principal "store front" for web-based order placement. As seen most clearly in FIG. 3, the process by which a ticket order is captured includes the following steps:

(1) The supply chain customer (e.g., retailer 13, supplier 15, etc.) places a ticket order with ticketing services bureau 113. The customer may directly place the ticket order with GOCA 113 through commerce module 119 (i.e., through an internet-based store front), whereby customer-specific sales catalogs or websites that are stored within commerce module 119 are utilized to facilitate the order placement process. As an alternative, the customer may place a ticket order electronically via electronic data interchange (EDI). As another alternative, the customer may place a ticket order to a customer service representative for ticketing services bureau 113 by telephone or facsimile. In turn, the customer service representative manually enters the ticket order into GOCA 113 through commerce module 119.

(2) Once the ticket order is received, commerce module 119 standardizes the information in the ticket order.

(3) The standardized ticket order is then sent from commerce module 119 to order management module 125 which, in turn, assumes the remaining responsibility of managing the ticket order, as will be described in detail below.

(4) The non-variable information relating to the ticket order (e.g., customer name, order number, etc.) is sent back to commerce module 119 from order management module 125. Similarly, the variable field information relating to the ticket order (e.g., price, size and style information relating to an article of commerce) is first identified by format manager module 121. If it is a manual order entry, it is displayed by commerce module 119 for input. Commerce module 119 then captures the variable data entered by the user. Validation is then performed on the variable data information by format manager module 121 and the updated variable information is sent back to commerce module 119.

Commerce module 119 provides password-protected security for system 111, with role-based access for authorized supply chain participants (e.g., retailer 13, supplier 15, etc.). One of the advantageous features of the present invention is that because all ticket order information is sent to commerce module 119 as noted above, authorized supply chain participants can "call out" or otherwise review pertinent details relating to the placed order through commerce module 119—the "store front" for GOCA 113.

Figure 4:
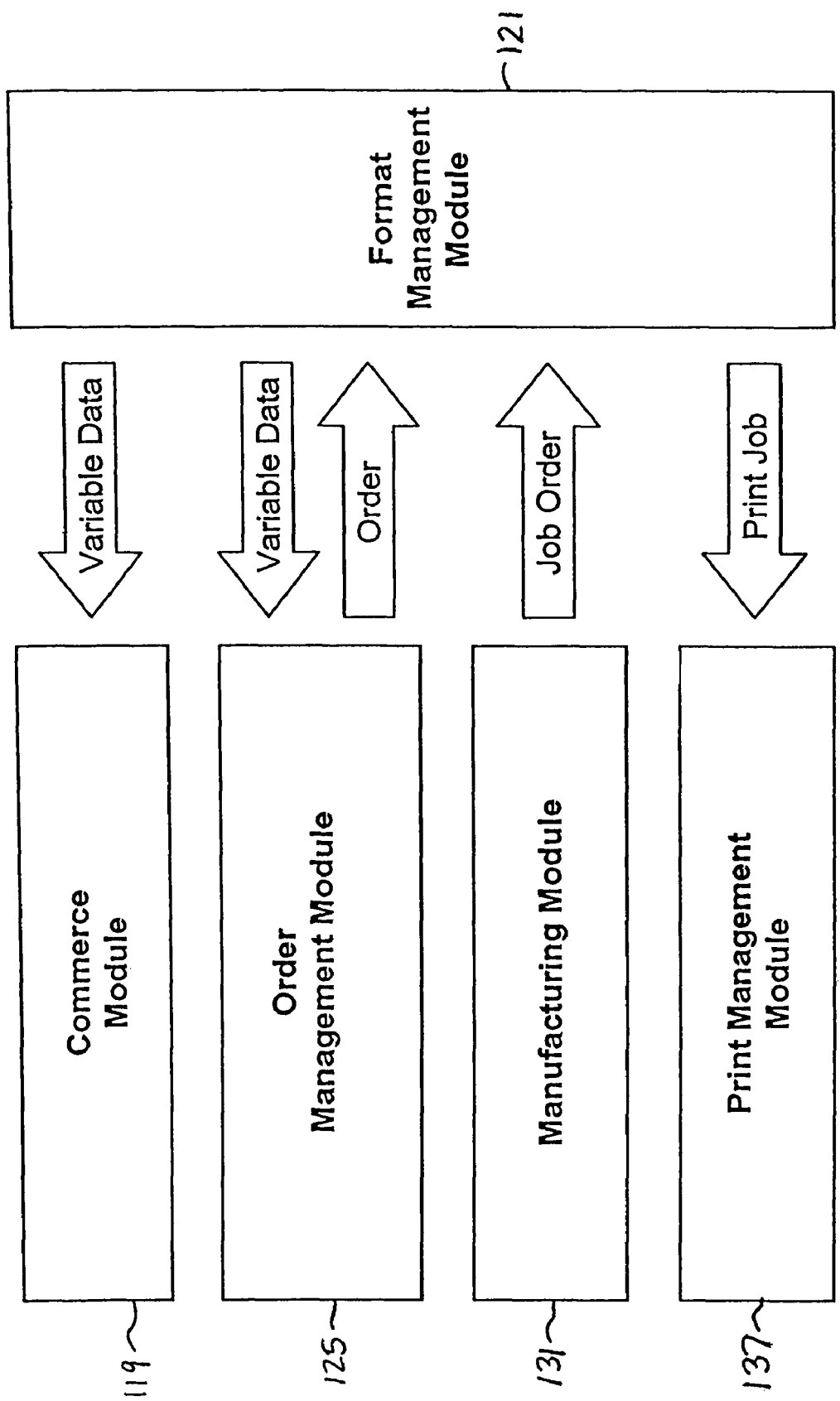
FIG. 4 is a schematic representation of selected modules in the system shown in FIG. 2, the schematic representation being useful in understanding how a ticket proof is generated and interactively reviewed by a client within the ticketing system of the present invention.

Ticket Proofing (i.e., Format Management) relates to the means by which the customer may review an electronic ticket proof file prior to ordering and, if necessary, directly modify any of the variable information associated therewith. In this manner, it is to be understood that the customer is provided with an interactive, dynamic web-based tag proofing system, thereby allowing for customer collaboration on tag design, which is highly desirable. As seen most clearly in FIG. 4, the process by which a ticket proof is created, reviewed and, if necessary, modified by the customer includes the following steps:

(1) Format manager module 121 identifies the variable and non-variable information from the ticket order using its ticket repository. The format manager module 121 then extracts the non-variable tag information for the ticket order. Examples of non-variable tag information may include standardized images for a ticket (e.g., stored graphics/artwork) as well as the overall specs of the tag (e.g., size, type, etc.).

(2) Format manager module 121 then retrieves the variable information relating to the ticket order. Examples of variable information collected by format manager module 121 include the non-stylistic attributes of a ticket order, such as the price, size, SKU and/or shipping information associated therewith.

Format manager module 121 also retrieves help text, prompts and other information relating to the ticket order (e.g., field length, min/max characters, and lists of values) and, in turn, provides said data to commerce module 119 in order to facilitate order capture. Further, format manager module 121 provides validation and catalog look-ups, and performs style and position attributes.

(3) The variable and non-variable information is used by format manager 121 to generate web-retrievable ticket images that can be proofed by the customer through commerce module 119. It should be noted that the ticket images are provided on dynamic screens which therefore allow for the customer to make immediate modifications. In this capacity, it is to be understood that format manager module 121 provides GOCA 113 with print-from-the-web (PFTW) capabilities, whereby a client located anywhere globally can design tickets using dynamic, web-enabled proofing screens.

(4) When the ticket proof has been approved by the client via commerce module 119, all of the variable ticket information associated with the order is sent from format manager module 121 to order management module 125.

It is to be understood that a physical ticket proof (i.e., a ticket sample) may be sent to the customer for review, if necessary.

System 111 permits graphic images to serve as variable information for a particular ticket order. System 111 allows the customer to interactively replace an image provided on a ticket proof. Information entered by the customer may identify the image directly (e.g., with an image file number), or indirectly (i.e., wherein the system generates the graphic image in response to other variable information provided by the customer, based upon rules in format manager module 121).

As a first example, a change of Style Number identifying types of shoes causes a graphic product image to change from a high-heel shoe to a golf shoe.

As a second example, a "color by size" color element may serve as variable information for a particular ticket order. For instance, a horizontal color bar is often provided on a price ticket and serves as a marker for the size of the article, wherein each size is represented by a particular color using industry color standards. For example, industry color standards may assign Pantone Matching System (PMS) color 1375C to small items, PMS color Yellow C to medium items, PMS color 355C to large items and PMS 300C to extra large items. It is to be understood that the color of a color bar that is used to represent a particular size is not limited to any one representation but rather may vary based on different industry color standards.

It should be noted that the apparel industry presently encourages retailers and manufacturers to utilize industry standards for color on garment tags that carry apparel size. Using "color by size" color bars, consumers can find an article of a particular size by locating a particular color bar on the ticket (i.e., regardless of the retailer or merchandise brand).

In this manner, it is to be understood that size information relating to an article can be input as part of the ticket order (e.g., through the use of simple numerical or alphabetical representations). In turn, format manager module 121 converts this size information into the appropriate "color by size" color bar that is to be provided on the ticket proof (and ultimately the printed ticket), which is highly desirable.

This variable graphic image capability supports both the first paradigm of identification media, wherein stylistic attributes are highly constrained, and the second paradigm wherein customers are given more stylistic freedom.

Figure 5:
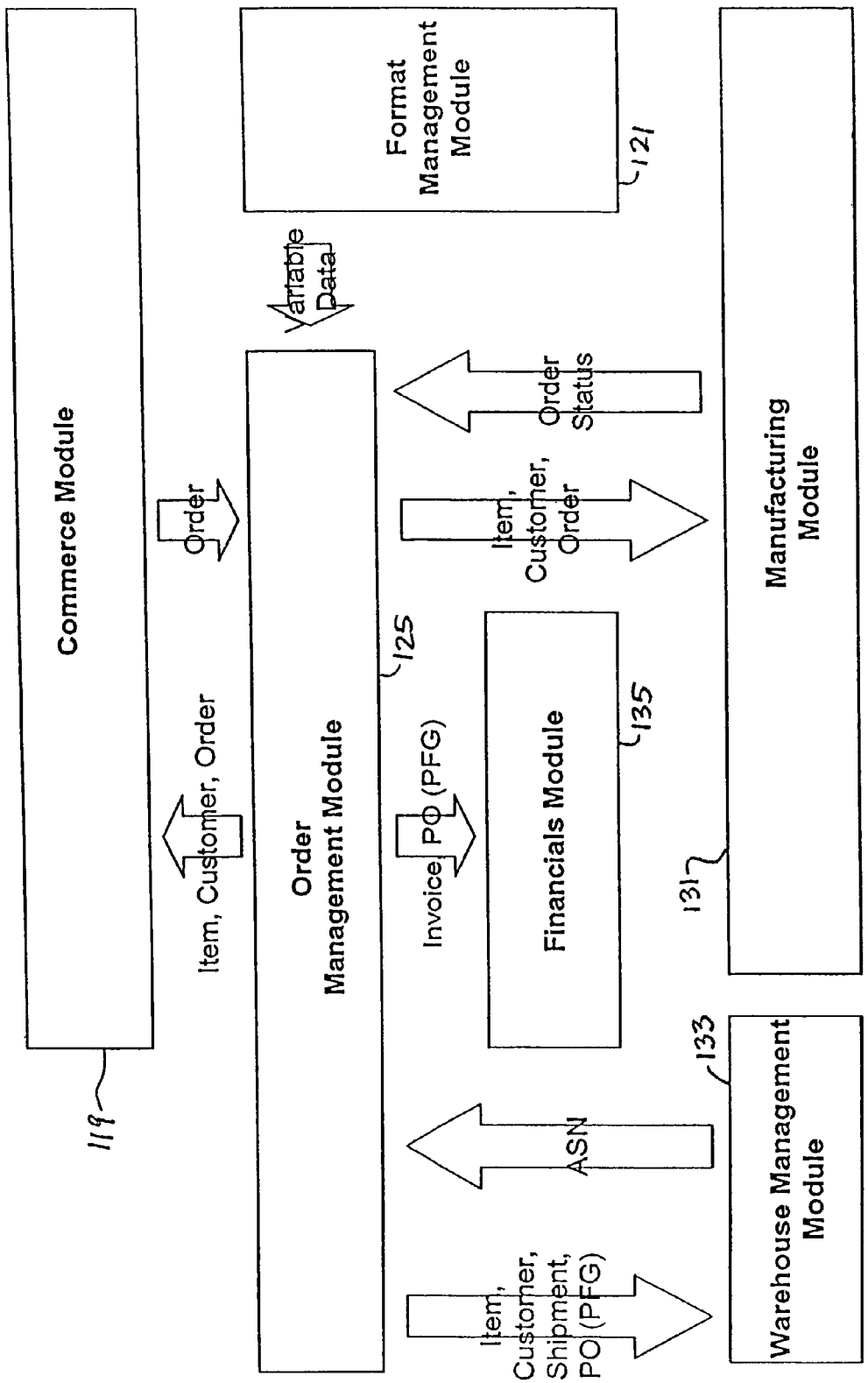
FIG. 5 is a schematic representation of selected modules in the system shown in FIG. 2, the schematic representation being useful in understanding how an approved ticket proof is then used to execute a ticket order by the ticketing system of the present invention.

Order Management relates to the means by which a ticket order is processed for ticket production. As seen most clearly in FIG. 5, the process by which a ticket order is processed for ticket production includes the following steps:

(1) Having verified the ticket proof in the manner described above, the ticket order is released from order management module 125 to manufacturing module 131 for print planning.

As will be described further below, manufacturing module 131, in turn, oversees the process of printing (i.e., filling) the ticket orders. At the same time, manufacturing module 131 provides order management module 125 with the frequent updates on the status of the pending ticket order.

(2) Financial information relating to the ticket order (e.g., invoice number, purchase order number) is released from order management module 125 to financials module 135 for management.

(3) As will be described further in detail below, order information used for tagging and packing purposes (e.g., item, customer, shipment and/or purchase order data) is released from order management module 125 to warehouse management module 133. In response thereto, warehouse management module 133 manages the processes of affixing the tickets to their corresponding articles, packaging the tagged products and generating advanced shipping notifications (ASN) relating thereto. Warehouse management module 133 then releases the advanced shipping notification (ASN) information back to order management module 125.

Figure 6:
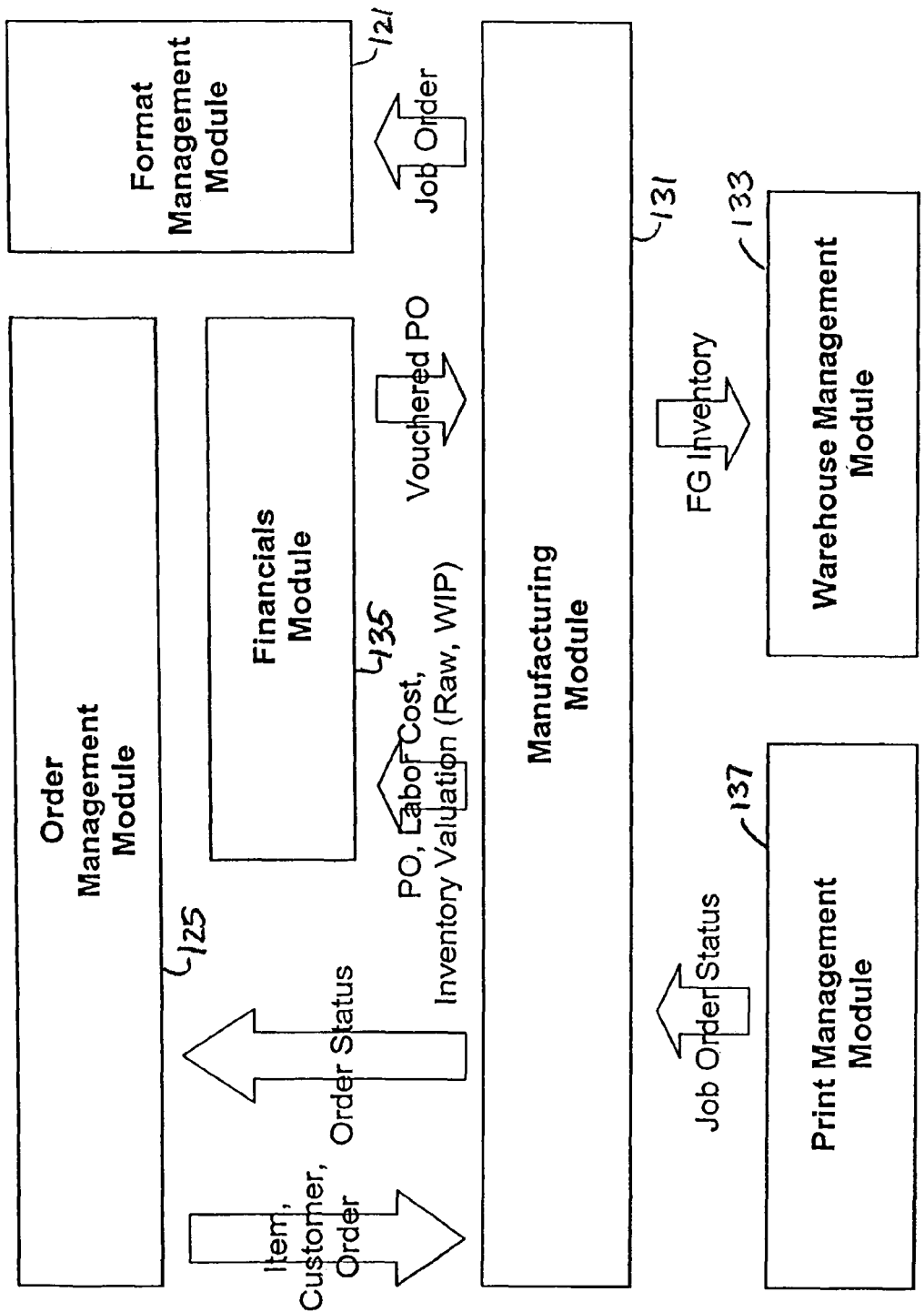
FIG. 6 is a schematic representation of selected modules in the system shown in FIG. 2, the schematic representation being useful in understanding how a ticket order is released for printing the ticketing system of the present invention.

Manufacturing Management relates to the means by which a ticket order is released for printing. As seen most clearly in FIGS. 2 and 6, the process by which a ticket order is released for printing includes the following steps:

(1) As detailed above, order management module 125 releases the ticket order to manufacturing module 131 for processing, the ticket order including at least some of the following information: the item number, customer number and order number associated therewith.

(2) Batch manager module 129 generates print job orders which, in turn, are released to format manager module 121 in order to generate detail specific print streams. As can be appreciated, the particular print streams are created to render the printing process more efficient and thereby more cost-effective. The print streams are then released to print manager module 137 by format manager module 121.

(3) Manufacturing module 131 additionally releases financial information relating to the print job order to financials module 135. Information released to the financials module 135 includes purchase order, labor costs, inventory valuation (Raw, WIP), etc. In turn, the financials module 135 sends back to manufacturing module 131 a vouchered purchase order.

(4) Manufacturing module 131 additionally releases inventory information to warehouse management module 133 which utilizes the inventory information for warehouse management purposes.

(5) During the actual printing process (to be described in detail below), status of the print job is received by order management module 125 from print manager module 137. In this manner, order management module 125 can effectively manage the status of the released print order.

Figure 7:
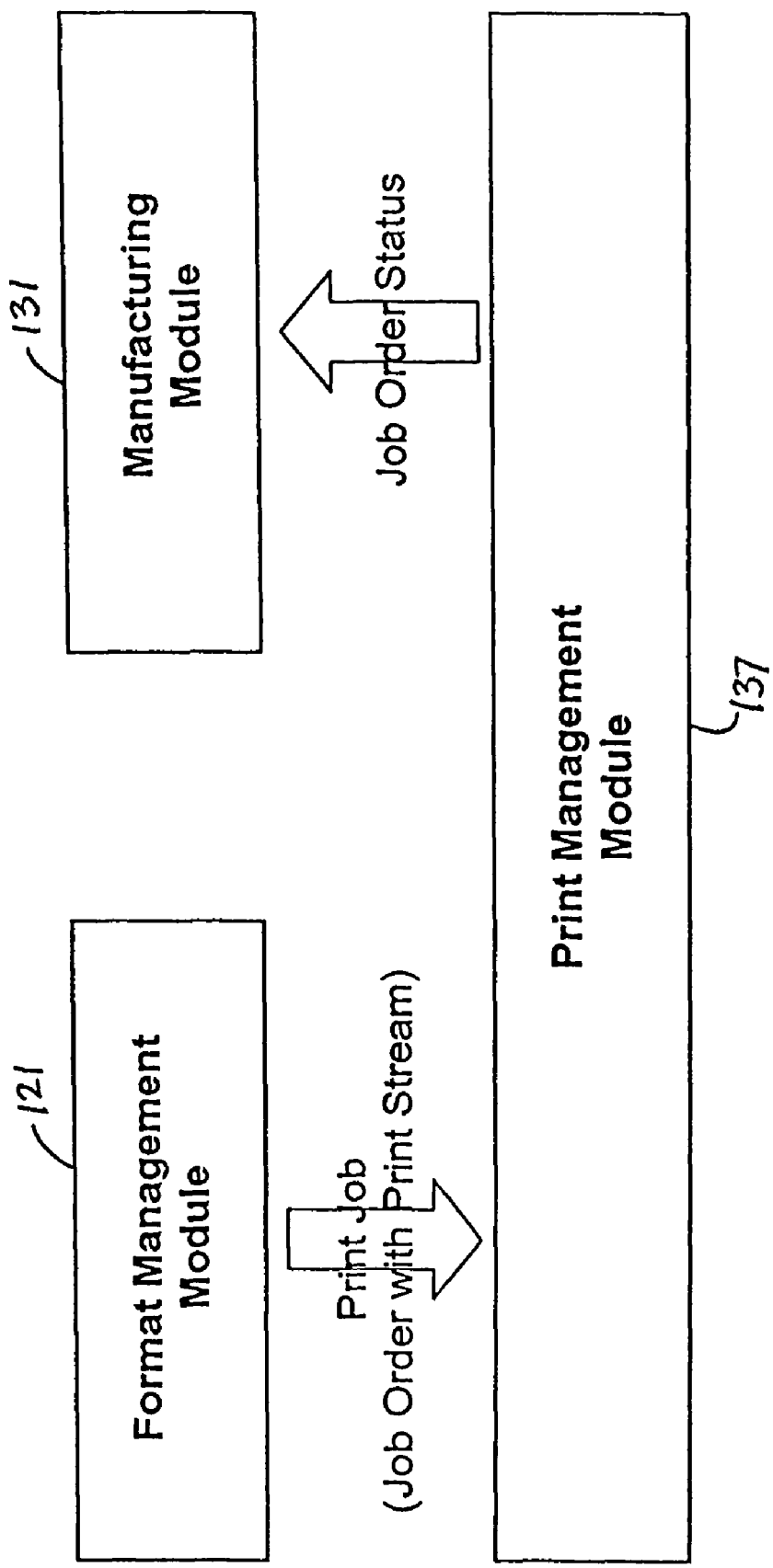
FIG. 7 is a schematic representation of selected modules in the system shown in FIG. 2, the schematic representation being useful in understanding how a released job order is printed at the print center.

Print Management relates to the means by which a released ticket order is printed at print center 115. It should be noted that, by decoupling the print management process from the manufacturing management process described above, the printing process can be standardized such that printing devices can be readily added, removed and/or replaced without compromising either process. In fact, multiple print centers 115 (each having multiple different printers, such as digital, offset, flexographic and/or thermal printers) can interface with GOCA 113 to provide a wide range of printing capabilities at a wide variety of different geographic locations. As seen most clearly in FIGS. 2 and 7, the process by which a print job is executed includes the following steps:

(1) As noted above, a print job order, which details the specific print streams that are to be executed, is released from format management module 121 to print manager module 137 via the internet 117 or other similar network.

(2) In turn, print manager module 137 manages the release of the print job orders. Specifically, print manager module 137 oversees the print screen queuing for multiple printer types and releases the print screen data streams to applicable printer interfaces. Printer interfaces may include one or more of the following: (a) printer software; (b) pre-press software; and (c) direct to the printer. Furthermore, if printer 139 utilizes printing plates, print manager module 137 releases the print stream to pre-print software that manages the generation of printing plates at pre-press 141.

(3) Print manager module 137 additionally provides order management module 125 with periodic status information relating to the released print job orders.

Figure 8:
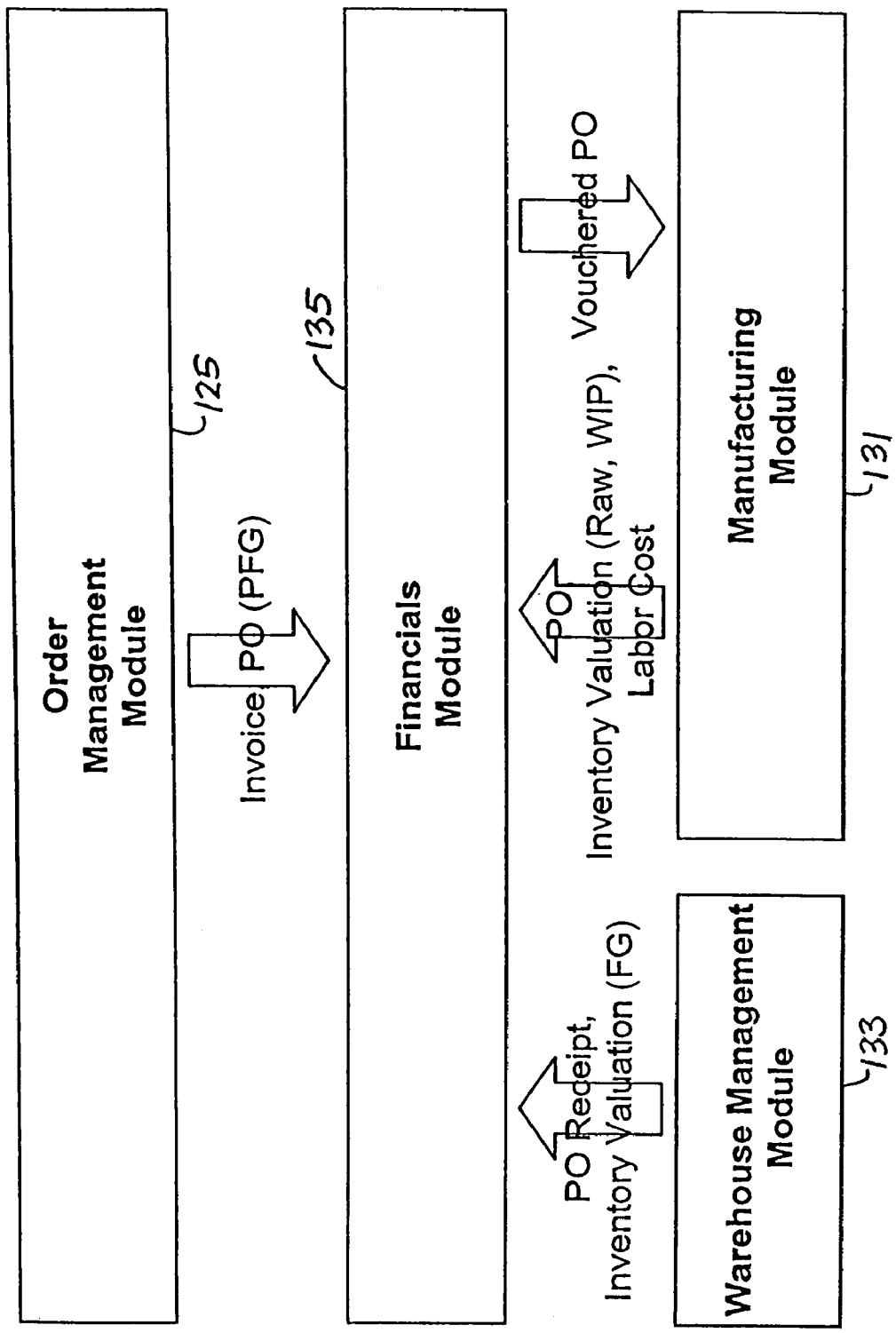
FIG. 8 is a schematic representation of selected modules in the system shown in FIG. 2, the schematic representation being useful in understanding how financial documents are processed by the ticketing system of the present invention.

Financials Management relates to the means by which financial documents relating to a ticket order is processed. As seen most clearly in FIG. 8, the process by which financial documents are processed includes the following steps:

(1) As noted above, financial information relating to a ticket order (e.g., invoices, purchase orders, etc.) is released from order management module 125 to financials module 135 for management.

(2) In addition, manufacturing module 131 releases financial information relating to a job order to financials module 135. The types of information released to financials module 135 include purchase order information, labor costs, inventory valuation (Raw, WIP), etc. Upon the receipt of this information, financials module 135 sends back to manufacturing module 131 a vouchered purchase order.

(3) When production of the tickets for the ticket order has been completed, warehouse management module 133 provides financials module 135 with purchase order information relating to the tickets, such as purchase order receipts and inventory valuation (FG).

Figure 9:
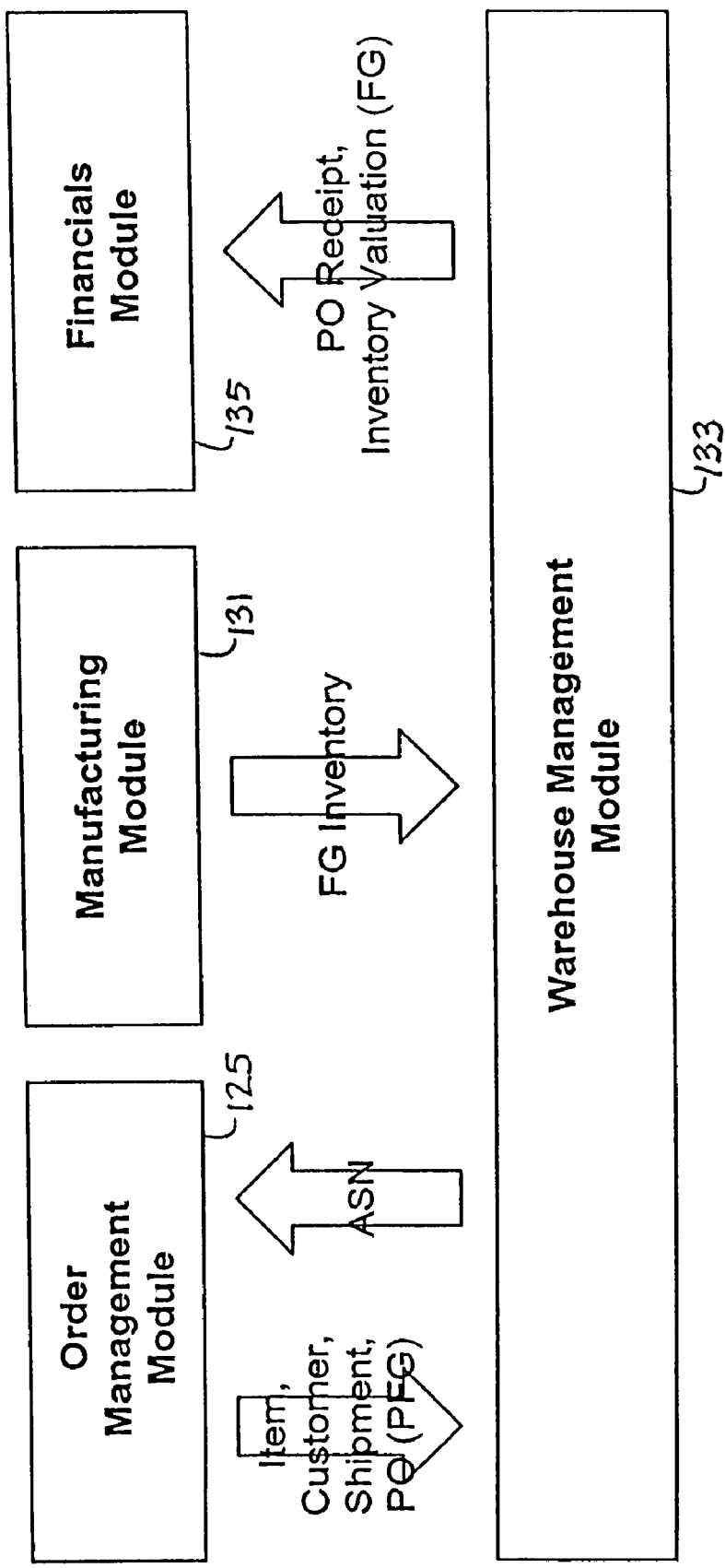
FIG. 9 is a schematic representation of selected modules in the system shown in FIG. 2, the schematic representation being useful in understanding how generated tags are affixed to articles of commerce and packaged in accordance with the client-specified instructions.

Warehouse Management relates to the management of the process in which generated tags are affixed to products and then packaged in compliance with client-specified packing instructions. As seen most clearly in FIG. 9, the process by which warehouse management module 133 controls the packing and shipping of tagged articles includes the following steps:

(1) As noted above, information relating to the ticket order that is to be used for packing and shipping purposes (e.g., packing instructions, item identification, customer name and shipment/purchase order information) is released from order management module 125 to warehouse management module 133. In addition, manufacturing module 131 releases FG inventory information to warehouse management module 133.

(2) Having received the aforementioned information from order management module 125 and manufacturing module 131, warehouse management module 133 manages the process by which manufactured tickets are affixed to related articles. In addition, warehouse management module 133 oversees the packing and shipping of the ticketed articles in compliance with packing and shipping instructions. When the packing process has been completed at manufacturing facility 19, warehouse management module 133 releases an advanced shipping notification (ASN) back to order management module 125.

(3) Furthermore, warehouse management module 133 releases financial information relating to the packaged and shipped articles (e.g., purchase order receipts, inventory valuation (FG)) to financials module 135.

Data Storage relates to the means by which relevant ticket order information is aggregated within a globally accessible database 143. Specifically, as seen most clearly in FIG. 2, a standard integration framework module 145 collects data from GOCA 113 in near real-time. In addition, integration framework module 145 is designed to receive data from any other affiliated ticketing systems. Stated another way, integration framework module 145 serves to collect data from GOCA 113 as well as any legacy ticketing service systems (i.e., systems prior to GOCA 113) in order to create a single, comprehensive and all-encompassing database 143, which is highly desirable.

Integration framework module 145 is based on service-oriented architecture (i.e., a collection of services that communicate with one another and which are self-contained in nature) and business process management (i.e., a set of activities which organizations can perform to either optimize their business processes or adapt them to new organizational needs). Preferably, integration framework module 145 is in the form of a Yantra Service Definition Framework.

Integration framework module 145 standardizes data as it is collected and, in turn, stores the standardized data in database 143 in near real-time. Database 143 preferably includes an operational data store (ODS), which is a temporary, or interim, database that stores time sensitive operational data that is to be accessed quickly and efficiently (e.g., data received within the last 30-60 days), and a data warehouse, which is a long-term database that stores historical data (i.e., data received over a period of years).

A global visibility module 147 is a web-based application that is connected to database 143, global visibility module 147 serving to organize business information for participants of the supply chain through a single user interface (i.e., "single sign-on"). In this manner, global visibility module 147 provides global access to pertinent business information (order info/status, inventory, sales numbers, etc.) to authorized personnel. Global visibility module 147 is preferably provided using a WebSphere Portal and provides windows into disparate information systems, like PeopleSoft and Yantra.

A global reporting module 149 is similarly a web-based application that is connected to database 143. Global reporting module 149 is preferably provided by Hyperion Performance Suite and makes the following types of reports available for review via the internet 117: (i) sales data (by product and customer); (ii) inventory data; (iii) service metrics; (iv) profitability information (by product and customer); (v) data models; (vi) analytic reports; (vii) data mart "builds"; and (viii) credit management.

Summarization of Overall Ticket Order Management Services Provided by GOCA 113

Figure 10:
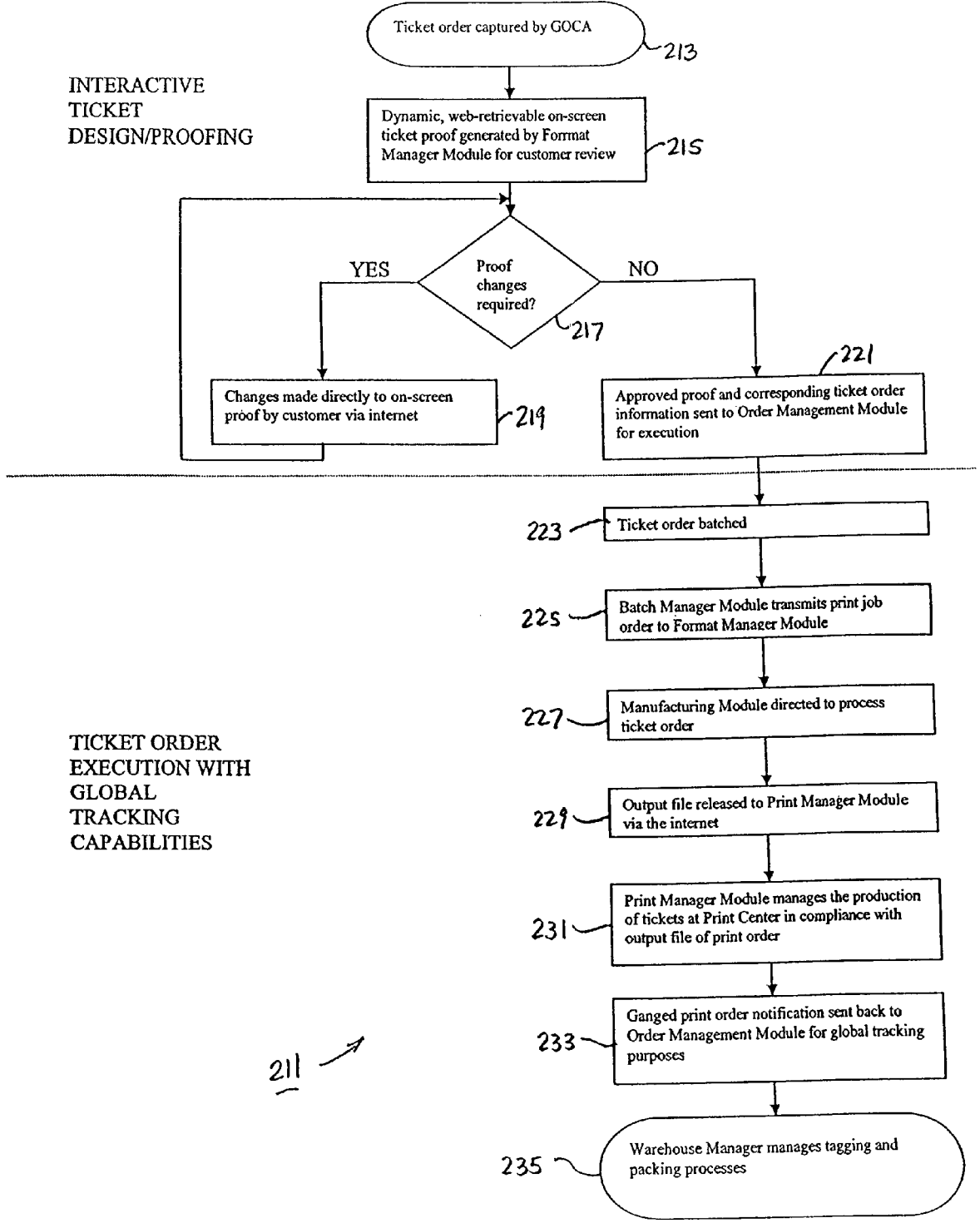
FIG. 10 is a flow chart depicting the process by which the ticketing system shown in FIG. 2 provides ticket management services for the retail supply chain.

Referring now to FIG. 10, there is shown a flow chart depicting the process by which GOCA 113 provides ticket management services for the retail supply chain, said process being identified generally by reference numeral 211. As will be described in detail below, process 211 provides a customer of the retail supply chain with (1) interactive customer ticket proofing/design, (2) globally visible ticket order information, and (3) printer-neutral management of variable ticket data, each of the aforementioned features serving as novel features of the present invention.

Process 211 commences when a ticket order placed by the customer is electronically captured into GOCA 113 through the web-based storefront (i.e., commerce module 119), said order capture step being represented generally by reference numeral 213. It should be noted that the order is preferably electronically received by commerce module 119. However, it is to be understood that the order may be placed via alternative means of communication (such as by FAX, email, telephone, etc.) and, in an additional step, manually keyed into commerce module 119 by customer service representatives for GOCA 113 (e.g., through the main storefront in commerce module 119 or through a specially-designed customer service storefront in commerce module 119). In the order, the template for the particular style of ticket to be printed is located in GOCA 113. Preferably, the following information is included in the order: (i) the customer; (ii) the order line; (iii) format number (i.e., the tag design); and (iv) variable data to be incorporated on the tag.

It should be noted that each component of variable data for a particular ticket order (e.g., style, size and appropriate color-by-size color bar) may be either (i) entered individually or (ii) retrieved from a customer specific "look-up table" using an assigned code in order to greatly simplify the ticket order placement process. As a first example of the use of a "look-up table" in step 213, it is to be understood that selected pieces of variable information (e.g., style, size and color bar) may be retrieved from a "look-up table" using a traditional, alphanumeric Stock Keeping Unit (SKU) code. As a second example of the use of a "look-up table" in step 213, it is to be understood that the input of size information may key a "look up" of the appropriate color-by-size color bar using customer-specified business rules.

Once the ticket order is received, commerce module 119 redirects (i.e., transfers) the ticket order to format manager module 121 for validation; then if the ticket order is validated, the order is transferred to order management module 125.

As noted above, ticketing services bureau 113 utilizes specified modules to generate a dynamic, on-screen ticket proof that can be reviewed by the client globally via the internet 117, the generation of said dynamic, on-screen ticket proof being identified generally by reference numeral 215. In addition, format manager module 121 serves to, among other things, retrieve any variable information associated with the tag proof, such as price, size, style, "color by size", etc. As a result, a web-based ticket proof is generated which the client can review through commerce module 119.

Figure 11:
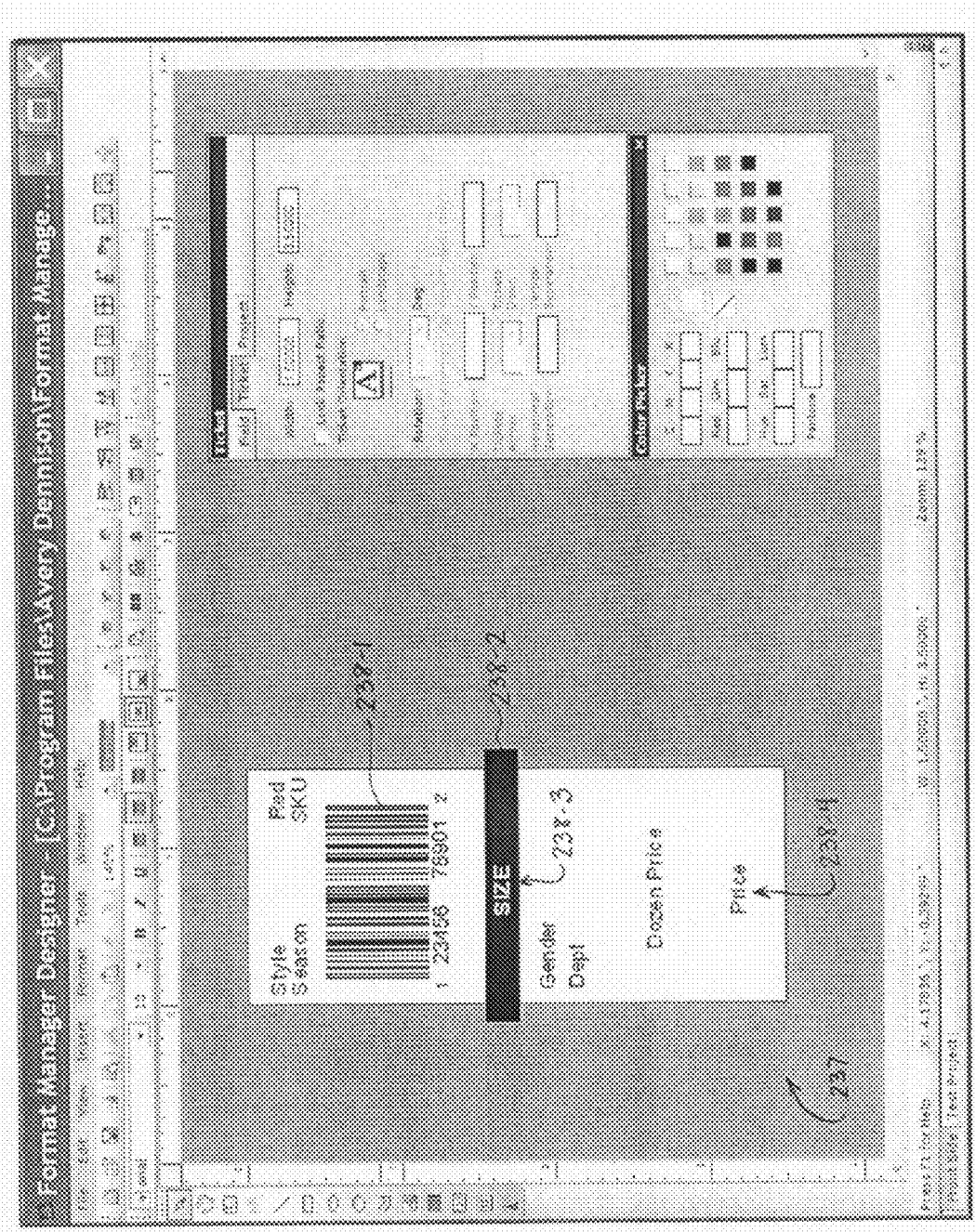
FIG. 11 is a screen display of one example of an on-screen ticket proof produced using the process shown in FIG. 10.

A screen display of one example of a web-based ticket proof is shown in FIG. 11 and identified generally by reference numeral 237. As can be seen, ticket proof 237 accurately represents a ticket to be produced in accordance with a placed ticket order, proof 237 including, among other things, a barcode 238-1, a horizontal color bar 238-2, size information 238-3 and price information 238-4. As noted above, for purposes of simplicity, the particular graphical elements of proof 237 may be provided in response to alphanumeric input codes using "look-up tables" to identify the underlying relationships.

With the ticket proof having been generated, the customer is then afforded the opportunity to determine whether any changes to the proof are required, said determination step being represented generally by reference numeral 217.

If alterations to the tag proof are deemed necessary, the client can edit the variable data of the on-line ticket proof via commerce module 119 as a screen that passes into the format manager module 121, said editing step being identified generally by reference numeral 219. It should be noted that any changes made with respect to the ticket proof in step 219 are reflected in the on-screen image of the tag in real-time. As a result, the customer is instantly provided with an on-screen image of the edited proof which, in turn, can be examined to ascertain whether any additional editing is required. In this manner, the customer is able to interactively design a web-based proof which will accurately depict the particular tag to be produced as part of the initial ticket order. As can be appreciated, this ability of GOCA 113 to provide its customers with a dynamic means of interactive tag review serves as a principal novel feature of the present invention.

As noted briefly above, the types of information which are to be categorized as variable data (and therefore capable of being modified during the dynamic proofing process) are largely dependent on the type of identification media to be generated by ticketing services bureau 113. Applicant has recognized two distinct paradigms of identification media which can be generated by ticketing services bureau: (1) identification media with relatively standardized formatting attributes (e.g., font type, font size, printed matter layout, etc.), such as conventional price tickets and shipping labels, and (2) identification media with relatively unique formatting attributes, such as fabric labels or other similar types of media which allow for the customer to implement item-specific design characteristics thereto.

With respect to the first paradigm of identification media, it is to be understood that system 111 preferably affords the customer with the ability to interactively modify non-stylistic attributes associated with a ticket, such as size, style, price, description code, country of origin, etc. To the contrary, the customer is not able to interactively modify stylistic attributes associated with a ticket, such as font characteristics (e.g., font type, font size, bold/italic/underline, scale, etc.) and layout (e.g., rotation, margins, field positioning, etc.), which are typically "givens" for a particular ticket type (e.g., conventional price tickets).

With respect to the second paradigm of identification media, it is to be understood that system 111 preferably enables a customer to interactively modify multiple attributes associated with a ticket including, inter alia, the stylistic attributes associated with a ticket, such as font characteristics (e.g., font type, font size, bold/italic/underline, scale, etc.) and layout (e.g., rotation, margins, field positioning, etc.).

Once the ticket proof has been approved by the client via commerce module 119, all of the variable ticket information associated with the ticket proof is sent from format manager module 121 to commerce module 119 which, in turn, sends it to order management module 125 where said information is bundled together with the original ticket order data, said sending step being identified generally by reference numeral 221 in FIG. 10. It should be noted that, although the format information associated with the ticket design is sent to order management module 125, the visual (i.e., digital) component of the approved tag can be retained within commerce module 119 (i.e., for future review by authorized parties).

With the design of the ticket having been approved in the manner as described above, the process by which the ticket order is executed follows herewith.

The order management module 125 oversees the batching process for the ticket order, said step being identified by reference numeral 223 in FIG. 10. Specifically, order management module 125 directs batch manager module 129 to manage order batching (i.e., grouping together similar ticket orders in order to minimize printing costs). In addition, format manager module 121 directs optimization manager module 127 to optimize the layout for printing by (1) determining the number of tags for each order that should be printed based on the layout from format manager module 121, and (2) minimizing the number of printing plates that will be needed.

Acting on instructions from order management module 125, batch manager module 129 then transmits a print job order (in compliance with the batching process executed in step 223) to format manager module 121, the transmission step being identified generally by reference numeral 225.

With the ticket order having been batched, format manager 121 calls optimization manager 127, if applicable, and takes the variable and non-variable data and generates an output file of the ticket design. It should be noted that order management module 125 determines which print center 115 is most aptly suited to generate the tickets and, in accordance therewith, format manager module 121 creates the output file in the particular format and layout required by the selected (i.e., target) printer 139. A very useful feature of the present ticket order processing system is that if it is necessary to change the printer or layout, format manager 121 automatically re-generates the output data file.

Order management module 125 then instructs manufacturing module 131 to process the print order, said instruction step being identified by reference numeral 227.

When printing is to be performed using non-digital printing means (e.g., offset printing, flexo printing, etc.), format manager module 121 produces a completed output file (e.g., a .pdf-type file) which includes, inter alia, page size, layout, margins, columns, number of ups, all graphics, fonts and other similar items needed for the printing press. It is also important to note that format manager module 121 separates this information into distinct plate layers for the printing device, thereby resulting in significant time and cost saving advantages.

It should further be noted that, for offset production, the output file generated by the format manager module 121 is run through the software for producing the physical plates used by the offset printing press. It is to be understood that format manager module 121 handles the process of displaying which batches/orders are ready to be released (including due dates, number of plates, colors, quantity, etc.) and then, upon direction of the operator, releases or routes the .pdf file to the plate making software.

For digital printing processes, a similar output file is released by format manager module 121 directly to the printer or to any other front-end software that is needed, as will be described further below.

Based on instructions from order management module 125, format manager module 121 then releases the output file as an electronic data stream formatted for the target printer 139, the output file being released to the print manager module 137 of the selected print center 115 as part of a designated print stream, said releasing step being identified generally by reference numeral 229. Preferably, format manager module 131 utilizes an AS/2-type protocol for optimized security and guaranteed delivery.

Print manager module 137 then manages all of the various print streams received from ticketing services bureau 113, said management step being identified generally by reference numeral 231. Specifically, print manager module 137 oversees the print screen queuing for multiple printer types and releases the print screen data streams to applicable printer interfaces, printer interfaces including one or more of the following: (a) printer software, (b) pre-press software, and (c) direct to printer. Furthermore, if printer 139 utilizes printing plates, print manager module 137 releases the print stream to pre-print software that manages the generation of printing plates at pre-press 141. It should be noted that, because print manager module 137 and format manager module 121 are separate yet interrelated modules, system 111 is able to support a wide variety of different printers, which is highly desirable.

At the same time that print manager module 137 releases ganged print orders to the appropriate printer interface, a notification relating to the ganged orders is sent back from print manager module 137 to order management module 125 in order to allow for the real-time tracking of relevant data with respect to the pending print order (e.g., status, labor information, etc), said step being identified generally by reference numeral 233.

To summarize, the format and print manager modules manage all of the steps that immediately precede the provision of the production ready file to the software responsible for actually driving the printing press (digital) or plate maker (offset). As a result, the best-of-breed software can still be used for this specific printing process.

Figure 12C:
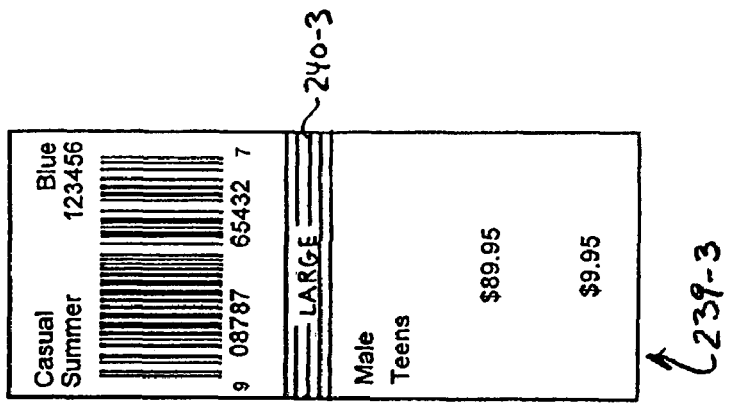
FIGS. 12(a)-(c) are front plan views of various types of physical tickets produced using the process shown in FIG. 10.
Figure 12B:
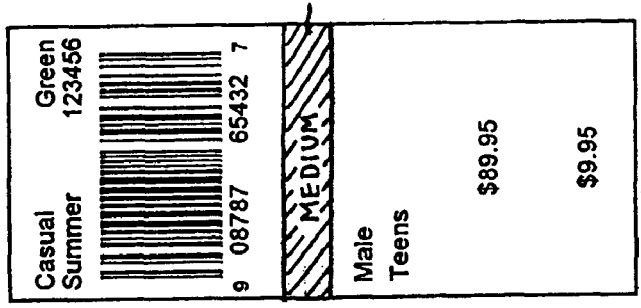
Figure 12A:
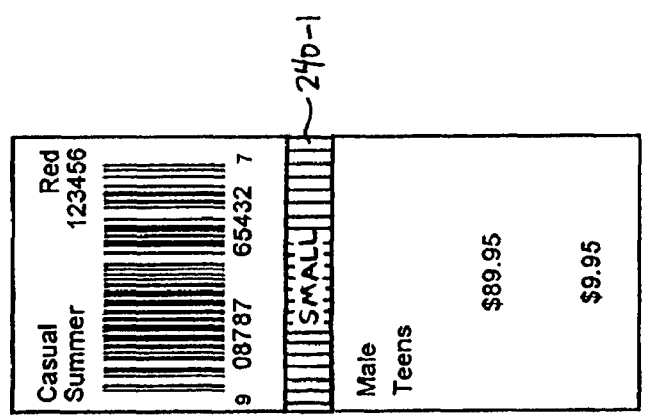

Referring now to FIGS. 12(a)-(c), there are shown front plan views of a variety of ticket samples 239-1, 239-2 and 239-3 that have been generated as part of ticket production step 231, with the principal distinction between the various ticket samples 239 relating to selected variable information printed thereon. Specifically, ticket samples 239-1, 239-2 and 239-3 differ from one another with respect to (i) the size information and (ii) color-by-size color coding printed thereon.

For example, referring now to FIG. 12(a), ticket sample 239-1 represents a price tag for an article of clothing that is a size small. Accordingly, ticket sample 239-1 is provided with a horizontal color bar 240-1 that shaded so as to represent the color red.

As another example, referring now to FIG. 12(b), ticket sample 239-2 represents a price tag for an article of clothing that is a size medium. Accordingly, ticket sample 239-2 is provided with a horizontal color bar 240-2 that is shaded so as to represent the color green.

As another example, referring now to FIG. 12(c), ticket sample 239-3 represents a price tag for an article of clothing that is a size large. Accordingly, ticket sample 239-3 is provided with a horizontal color bar 240-3 that is shaded so as to represent the color blue.

It should be noted that each ticket sample 239 may be generated using flexographic printing means. However, it is to be understood that each ticket sample 239 could be generated by alternative printing means (e.g., offset, thermographic, digital printing means, etc.) without departing from the spirit of the present invention.

It should also be noted that each ticket sample 239 is not limited to the particular appearance as represented herein. Rather, it is to be understood that the size, shape and/or layout of variable information for each ticket sample 239 could be modified without departing from the spirit of the present invention.

Once the ticket printing process has been completed, warehouse management module 133 is instructed by order management module 125 to manage the tagging and packing operations at manufacturing facility 19, said step being identified generally by reference numeral 235. It should be noted that warehouse management module 133 provides pertinent packing information (e.g., advanced shipping notifications (ASNs)) to order management module 125 which are, in turn, globally retrievable by authorized participants of the supply chain for tracking purposes, which is highly desirable. At the same time, invoices may be sent by order management module 125 to financials module 135 for processing.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

As an example, the above-described method is described in conjunction with the production of tickets, tags, labels and the like. However, it is to be understood that the novel concepts described herein could be implemented with respect to any type of printed item without departing from the spirit of the present invention.

As another example, it is to be understood that modules in ticketing services bureau 113 could be added, removed and/or combined without departing from the spirit of the present invention.

As yet another example, it should be noted that the interactive, web-based process of ticket proofing described above eliminates the need in most circumstances for the production of physical ticket samples. However, it has been found that in certain situations there is a distinct need for the web-based ticket proofing process 211 described above to include an additional physical ticket sample proofing step after the customer has tentatively approved the on-screen ticket proof.

The need for a physical ticket sample may occur, for example, when a customer wishes to confirm the accuracy of a color match. As can be appreciated, it has been found that, due to inherent color variations between printing press inks and computer displays, on-screen color matching affords the customer with a lesser degree of reliability and accuracy than most other aspects of on-screen proofing.

Color printing systems are used to reproduce computer-generated images using a limited number of colorants (pigments, dyes, etc) that do not have ideal absorption characteristics. Therefore it is well known to apply "color correction" techniques so that printed colors provide the best possible match to original artwork. This color correction typically involves converting red-green-blue signals (hereinafter RGB) that measure the color of the original, to multi-color standards or color separations that control the amount of colorants used to print. Best known is the four color standard yellow-magenta-cyan-black (hereinafter YMCK) widely used for process printing. A more recent color standard is Hexachrome® (Hexachrome is a registered trademark of Pantone, Inc., Carlstadt, N.J.), which expanded the printable color gamut by utilizing brighter YMCK inks and adding orange and green inks.

Digital printing systems quantize images both spatially and tonally. A two dimensional image is represented by an array of picture elements or "pixels", the color of each pixel being represented by a plurality of tone or shade values that correspond to the color components of the pixel. The color values would comprise either a set of RGB values (as an image is measured) or a set of YMCK values (to be used to used to control the amount of ink used by a printer to best approximate the measured color). Thus a color image, comprising an array of pixels, may be stored in the computer as a set of data points. Color correction typically is implemented via look-up tables of spectral photometric properties.

Another known circumstance requiring color correction arises from the fact that each printing system uses its own particular combination of ink, paper, and press conditions. Therefore, in reliably reproducing artwork on two different types of printers, it is often necessary to convert a set of data points that represent a set of halftone dot percentages on the first printer to a second set of data points that represent the same set of color intensities on the second printer.

The need for a physical ticket sample may also occur in order to satisfy subjective customer preferences that may arise only after a physical ticket sample has been printed. Specifically, it has been found that the particular texture (e.g., matted) and/or finish (e.g., gloss) of the substrate on which the ticket is to be printed can significantly alter the overall look of the finished product and, as a consequence, can only be observed by generating physical test samples.

Figure 13:
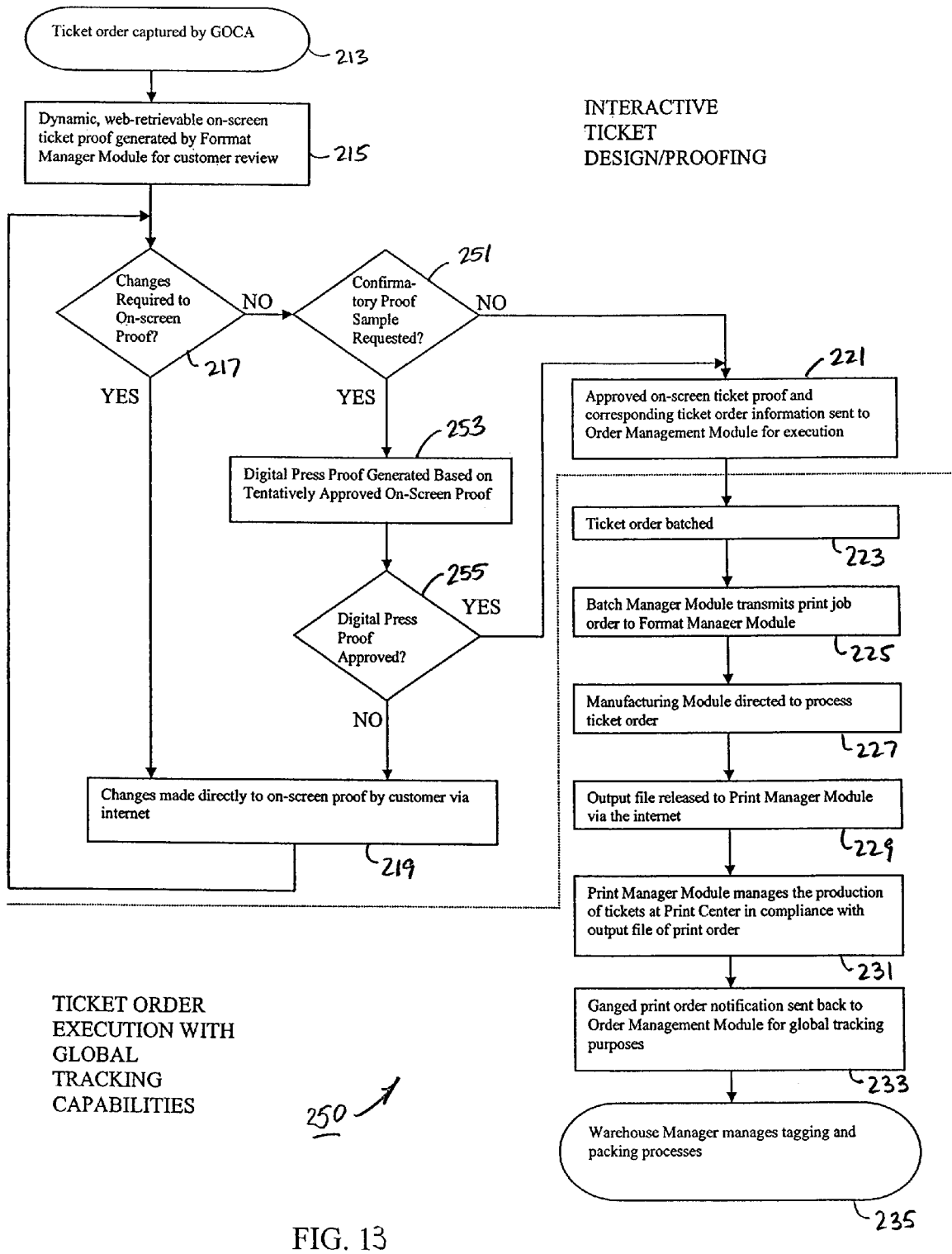
FIG. 13 is a flow chart depicting a modification to the process shown in FIG. 10, the modification including an option to generate a physical digital printing ticket proof in order to confirm a tentatively approved on-screen ticket proof.

Accordingly, it is to be understood that the process 211 shown in FIG. 10 could be modified to include the option of generating a physical ticket proof (i.e., a ticket sample) in order to confirm a tentatively approved on-screen ticket proof, said modified process being shown in detail in FIG. 13 and represented generally by reference numeral 250.

As seen in FIG. 13, process 250 is similar to process 211 in that process 250 commences with a ticket order being electronically captured by GOCA 113 (i.e., step 213). It should be noted that, upon receiving the ticket order, GOCA 113 designates a particular printing platform for execution the ticket order. Stated another way, GOCA 113 designates which particular type of printing press (e.g., flexographic, offset, digital) will ultimately be used to print the ticket order. It should be noted that the designated printing platform may be selected, inter alia, (i) based on explicit customer designation, (ii) based on prior printing history with the customer, and/or (iii) based on logical deduction by GOCA 113 (e.g., the selection or a material for the ticket substrate may necessitate the use of a particular printing press).

With the ticket order having been electronically captured by GOCA 113, the user is able to retrieve via the internet an on-screen ticket proof (i.e., step 215). It should be noted that the look of the on-screen proof takes into account the particular print characteristics of the press platform designated to print the ticket order.

If the customer determines that changes are required to the on-screen proof (i.e., step 217), the customer can directly modify the on-screen proof via the internet (i.e., step 219). Once the customer is satisfied with the on-screen proof, the tentatively approved on-screen ticket proof and corresponding ticket order information are ultimately sent to order management module 125 of GOCA 113 for execution (i.e., step 221). In response thereto, order management module 125 manages the execution of the ticket order (i.e., steps 223-235).

As can be seen in FIG. 13, process 250 differs from process 211 in that once the on-screen proof has been tentatively approved (i.e., step 217) but prior to the transmission of said proof to order management module (i.e., step 221), the customer is provided with the option of receiving a physical ticket sample in order to confirm the tentatively approved on-screen sample, said option step being identified generally by reference numeral 251.

If the customer does not require a physical ticket sample, the tentatively approved on-screen ticket proof is confirmed as being finally approved and, in turn, the on-screen proof (as well as the corresponding ticket order information) is sent to order management module 125 for execution (i.e., step 221). At this time, process 250 continues in an identical fashion with process 211.

However, if the customer requests that a physical ticket sample be generated based on the on-screen ticket proof, print manager module 137 sends a ticket proof request (based on the tentatively approved on-screen proof) to a print center 115 with digital proofing capabilities. At print center 115, a physical ticket sample is generated based on the tentatively approved on-screen proof, said sample generation step being identified generally by reference numeral 253. It should be noted that the particular process in which a ticket sample is generated in step 253 serves as the principal novel feature of the present invention and, accordingly, is described in greater detail below.

Preferably, the physical ticket sample is generated at the selected print center 115 using either (i) a digital printing press that is dedicated solely to printing ticket proof samples or (ii) a digital printing press that is additionally assigned to generate production quantities of tickets. One type of digital printing press that may be used to produce the physical ticket sample is an HP Indigo Digital Press of the type commercialized by Hewlett-Packard Company of Atlanta, Ga. As can be appreciated, digital printing presses (e.g., the HP Indigo Digital Press) provide high print quality using a plateless imaging system. As a result, digital printing presses (also referred to in the art simply as digital printers or digital presses) are commonly characterized as providing short-run and cost-effective techniques for printing documents while, at the same time, allowing for a greater degree of variability of the printed subject matter. In this capacity, it is to be understood that a digital printer would be particularly useful, among other things, in generating a limited supply of physical ticket samples that may or may not require modification.

Once the physical ticket sample has been generated using the digital press and provided to the customer, the customer is again afforded the opportunity to evaluate whether any modifications need to be made to the proof, said evaluation step being identified generally by reference numeral 255.

If the customer determines that no further modifications to the ticket proof are needed, the ticket proof is deemed to be finally approved. At that time, the process 250 proceeds to step 221 and the ticket order is executed using the finally approved on-screen ticket proof.

However, if the customer is unsatisfied with the physical ticket proof and determines that further modifications are required, process 250 proceeds to step 219, which affords the customer with the opportunity to make direct changes to the on-screen proof via the internet. After any changes have been made to the on-screen proof in step 219, process 250 returns back to step 217 and the entire proofing process (i.e., loop) is repeated. In this manner, it is to be understood that the customer is able to modify the on-screen proof in accordance with any objectionable attributes noted in the physical ticket proof. Accordingly, through the use of both on-screen ticket proofs and physical ticket samples, the customer is afforded the opportunity to thoroughly inspect and, if necessary, modify a ticket proof prior to the execution of the ticket order, thereby eliminating the likelihood of a customer requesting a costly re-print of an entire ticket order.

Figure 14:
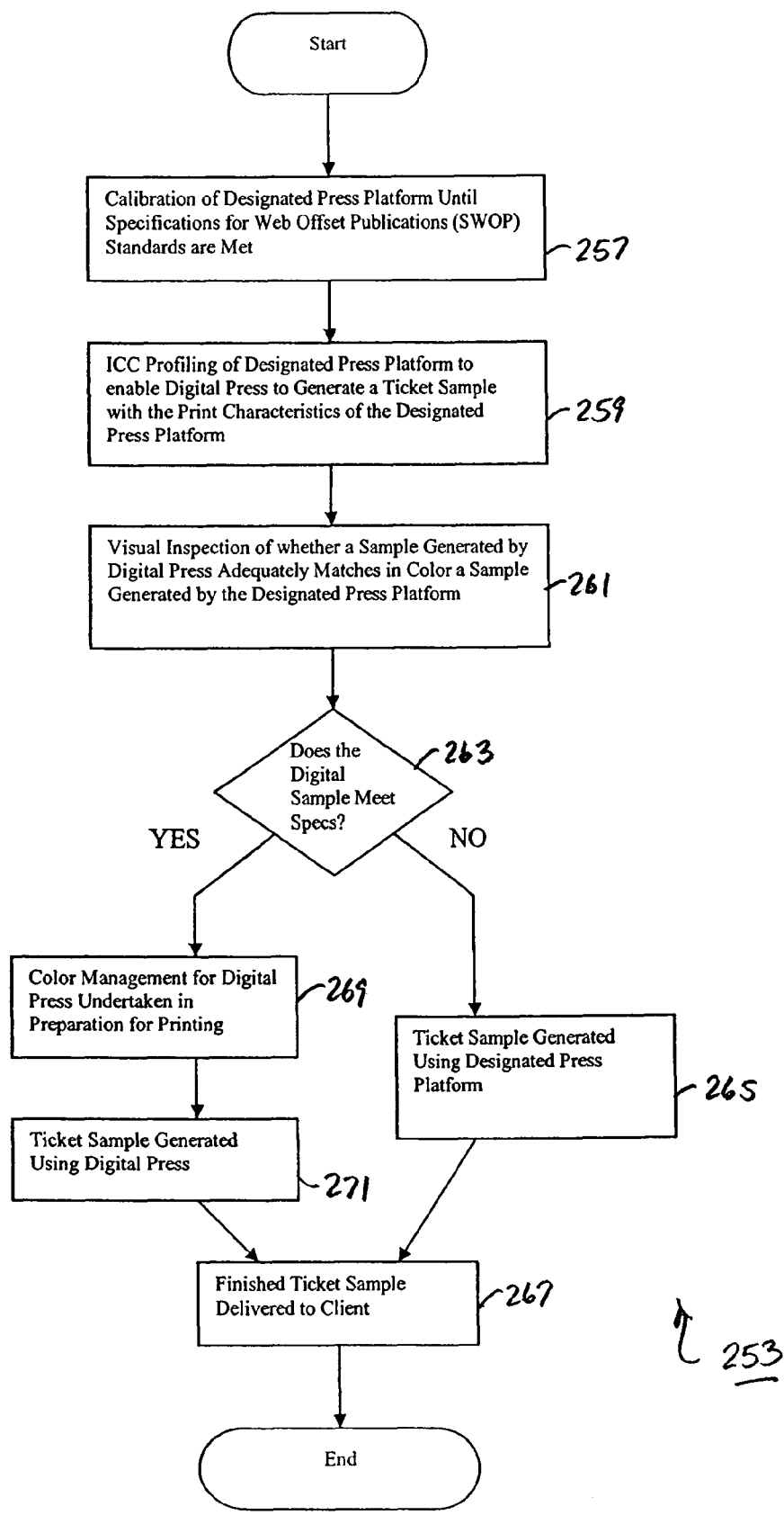
FIG. 14 is a flow chart depicting the process by a ticket sample is generated using the tentatively approved on-screen proof referenced in FIG. 13.

As noted above, step 253 relates to the detailed process in which a physical ticket sample of the tentatively approved on-screen proof is generated (preferably using a digital press) that adequately matches the print characteristics of a ticket produced using the designated press platform (e.g., an offset or flexographic press). Referring now to FIG. 14, there is shown a flow chart that depicts in greater detail ticket sample generation process 253. Specifically, in the first step of process 253, every available press platform (e.g., an offset press, a flexographic press and/or a digital press, etc.) at the designated print center 115 is calibrated to meet Specifications for Web Offset Publications (SWOP) standards, said calibration step being identified generally by reference numeral 257. As will be described in greater below, the calibration of each press to an internationally established printing standard is accomplished by printing a test file and, if deemed necessary, adjusting the press based on the results derived therefrom.

It should be noted that SWOP is an accredited standard that requires a certification of results in order to claim compliance therewith. SWOP standards specify, among other things, that measurements relating to color control bar on proofs and production outputs comply with certain standards. In the present invention, the black solid ink density (SID) target and color control bar precludes it from meeting SWOP standards since SWOP standards require an SID range of approximately 150-155 and the method of the present invention produces SID measurements of approximately 175. As a result, although the present print target standard is based on measurement controls within SWOP, it is to be understood that the method of the present invention is not actually SWOP compliant.

Having calibrated the various presses at print center 115, an International Color Consortium (ICC) profiling process is undertaken with respect to the designated press platform (e.g., offset, flexographic, digital, etc.), said ICC profiling process being identified generally by reference numeral 259. Simply stated, ICC profiling process 259 relates to the formulation of a profile, or recipe, that is applied to the digital press which enables it to print with the same printing characteristics as the designated plate-based press platform (e.g., a flexographic or offset printer). Accordingly, once the profile is set for the digital press, any print file sent to the digital press will generate a proof that accurately replicates the print characteristics of a ticket produced by the designated press platform, which is highly desirable.

It should be noted that ICC profiling process 259 is required because each type of printing press has unique printing characteristics. As a result, the tentatively approved on-screen proof which was generated based on the print characteristics of the designated production platform (which is often plate-based in nature) may require alteration for printing using a digital printing press (e.g., color conversion values may be applied to the color palette of a digital press to more accurately correspond to the color palette of an offset printing press). Without ICC profiling process 259, a physical ticket sample generated by a digital printer may not accurately represent how the executed ticket order would appear when printed on the designated printing platform. It should be noted that the particular process in which the on-screen proof is converted for production of a sample using a digital press serves as a novel feature of the present invention and, as such, is described in greater detail below.

Upon completion of step 259, a sample generated by the digital press is visually inspected against a sample generated by the designated press platform for adequate color matching, said inspection step being identified generally by reference numeral 261. A Global Product Developer (GPD) then determines whether the sample generated using the digital press meets specifications, said determining step being identified generally by reference numeral 263.

As an example, for ticket orders designated for production using an offset or flexographic press, the GPD must determine whether the digital press will replicate Pantone Matching System (PMS), spot or special match colors using either (i) a premixed solid color or (ii) a process build on the digital press using its process colors (Yellow, Magenta, Cyan, Black, Orange, Violet and Green). As can be appreciated, it has been found that in some instances the colors of the digital press will not be able to match colors produced on an offset or flexographic press (e.g., metallic colors or proofs on very unique substrates).

If the sample generated using the digital press fails to meet specifications, the ticket sample is generated using the designated press platform, said sample generation step being identified generally by reference numeral 265. In turn, the generated sample is delivered to the client for review, said delivery step being identified generally by reference numeral 267. As noted above, the use of a plate-based printing press to generate a ticket proof introduces a significant cost component. As a result, it is to be understood that the preferred means of generating the ticket proof is using a digital press.

Accordingly, if the sample generated using the digital press meets specifications, color management of the digital press is undertaken in preparation of printing a sample, said color management step being identified generally by reference numeral 269. As will be described further below, color management step 269 relates to a process of color management for the digital press in order to ensure accurate color representation of the ticket sample generated by the digital press. Upon completion of color management step 269, the ticket proof is generated using the digital press, said proof generation step being identified generally by reference numeral 271. Once the proof is completed, the finished ticket sample is delivered to the client in step 267.

Figure 15:
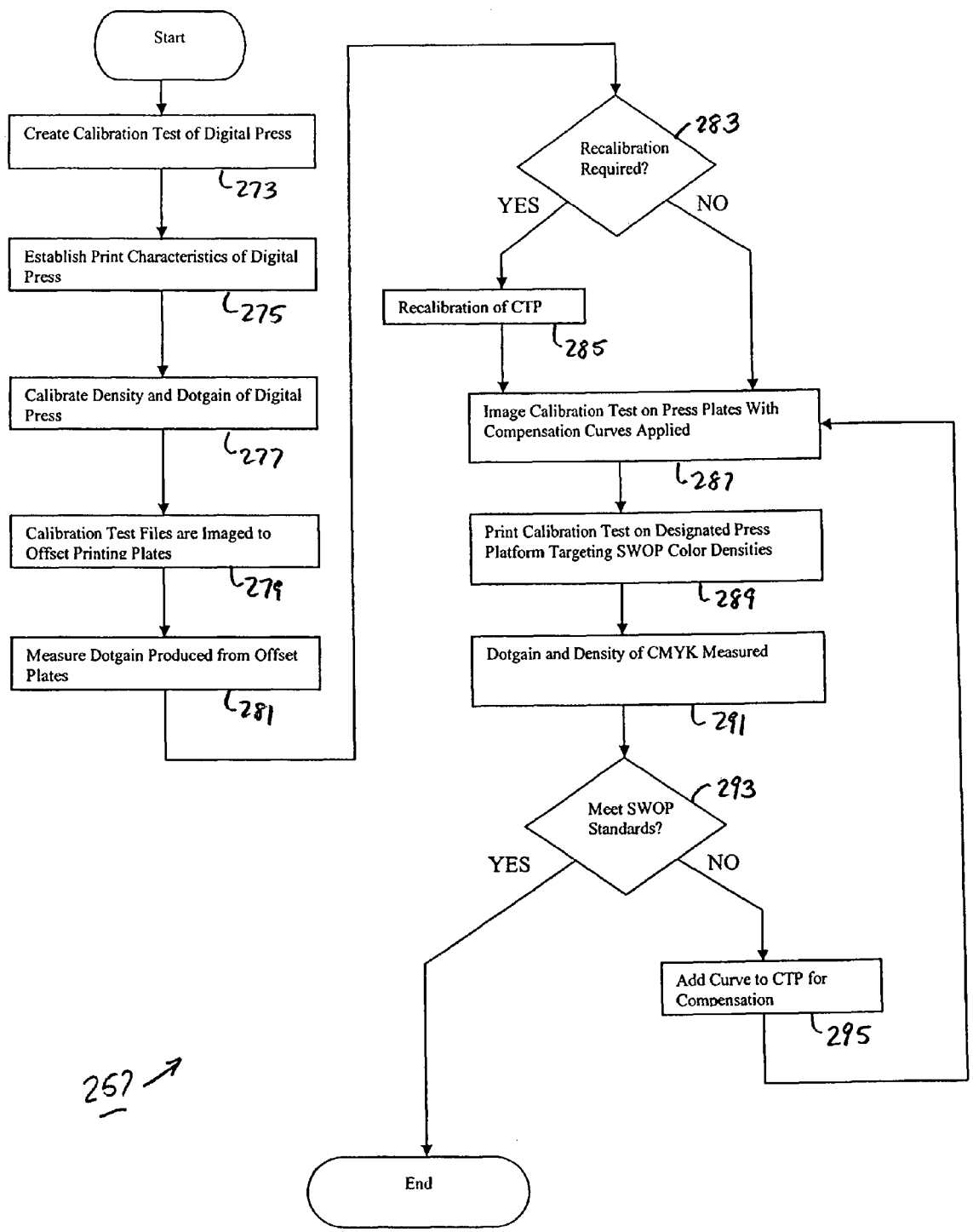
FIG. 15 is a flow chart depicting in greater detail the calibration process referenced in FIG. 14.

Referring now to FIG. 15, there is shown a flow chart that depicts calibration process 257 in greater detail. Specifically, in the first step of calibration process 257, a calibration test of the digital press is created that includes: (i) a Cyan, Magenta, Yellow, Black (CMYK) grey ramp; (ii) a registration test; (iii) a density test; and (iv) selected color gamut tones, said calibration test creation step being identified generally by reference numeral 273. The calibration test used in step 273 is then utilized to establish the print characteristics of the digital press (e.g., density and dotgain), said establishment step being defined generally by reference numeral 275. Using the calibration test results, the density and dotgain of the digital press is calibrated to standard web offset printing (SWOP) standards, said digital press calibration step being identified generally by reference numeral 277.

The digital calibration test files are then imaged directly from a computer to printing plates for the designated printing platform (i) without the use of film (i.e., computer-to-plate (CTP) process) and (ii) with no compensation curve applied, said plate imaging step being identified generally by reference numeral 279. The imaged printing plates are then used to measure the dotgain of Cyan, Magenta, Black and Yellow at 0%, 25%, 50%, 75% and 100%, said dotgain measurement step being identified generally by reference numeral 281.

The results of the dotgain measurements are then analyzed to determine whether recalibration of the plate imaging process is required, said analyzation step being identified generally by reference numeral 283. Specifically, the dotgain measurements are analyzed to determine whether the dotgain at 0% is actually 0%, whether the dotgain at 25% is actually 25%, etc.

If recalibration is required, the computer-to-plate (CTP) is recalibrated, said recalibration step being identified generally by reference numeral 285.

If no recalibration is required (or after completion of calibration step 285), the digital press calibration test is imaged onto printing plates at CTP with compensation curves applied and said plates are, in turn, sent to the designated press platform, said imaging step being identified generally by reference numeral 287. The designated press platform (e.g., offset press, flexographic press, etc.) is then used to print the digital calibration test targeting specifications for standard web offset publications (SWOP) color densities, said printing step being identified generally by reference numeral 289. The dotgain is then recorded at 50% for CYMK.

Utilizing a four color greyramp, the dotgain and density of CYMK is measured at 0%, 25%, 50%, 75% and 100%, said measurement step being identified generally by reference numeral 291. Upon completion, the measured dotgain and density are examined relative to SWOP standards, said examination step being identified generally by reference numeral 293. If the density and dotgain readings meet SWOP standards, process 257 ends (and process 253 advances to ICC profiling step 259).

However, if the density and dotgain readings does not meet SWOP standards, a curve is added to the CTP to compensate for the deviation in density and dotgain from SWOP standards, said curve adding step being identified generally by reference numeral 295. With said curve having being added, process 257 returns to step 287. It should be noted that, in the situation where the designated press platform is a digital press (rather than a place-based press), changes are made directly to the digital press profile to place said press in compliance with SWOP standards for density and dotgain.

Figure 16:
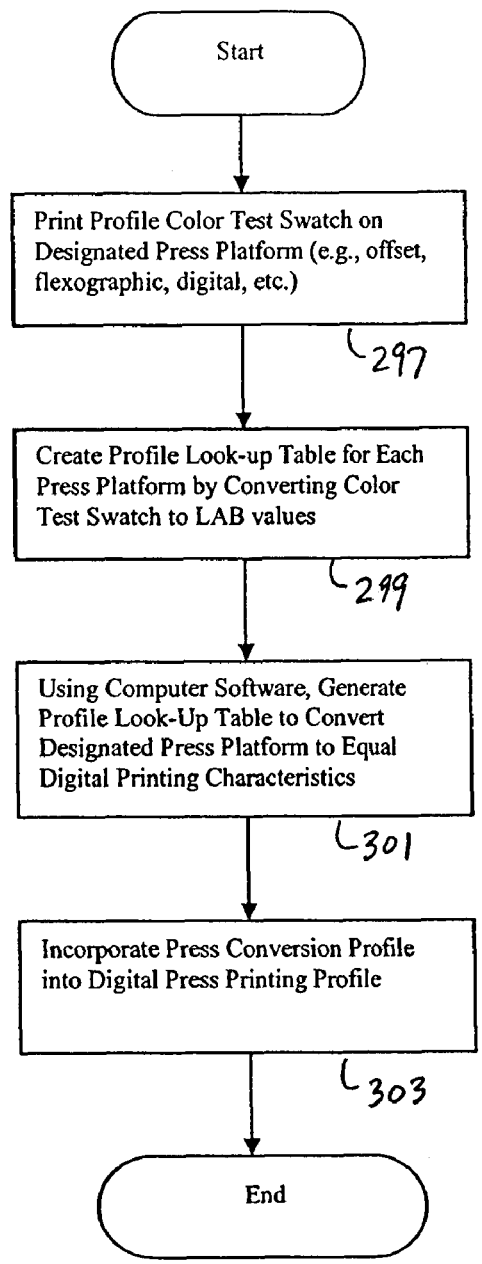
FIG. 16 is a flow chart depicting in greater detail the ICC profiling process referenced in FIG. 14.

As noted above, ICC profiling process 259 commences upon completion of calibration process 257. Referring now to FIG. 16, there is shown a flow chart depicting ICC profiling process 259 in greater detail. Specifically, in the first step of process 259, a profile color test swatch is printed using the designated press platform, said swatch printing step being identified generally by reference numeral 297. The color test swatch created in step 297 is, in turn, converted to LAB values to create a profile look-up table for each press platform, said table creation step being identified generally by reference numeral 299.

Using computer software, a profile look-up table is then generated to convert the designated press platform to equal digital printing characteristics, said conversion step being identified generally by reference numeral 301. The resulting press conversion file is then incorporated into the digital press printing file, said incorporation step being identified generally by reference numeral 303. In this manner, the digital press is configured to replicate the print characteristics of the designated press platform.

It should be noted that an alternative method of ICC profiling is described in European Patent Application No. 584019, which published on Feb. 23, 1994, said application being incorporated herein by reference.

Figure 17:
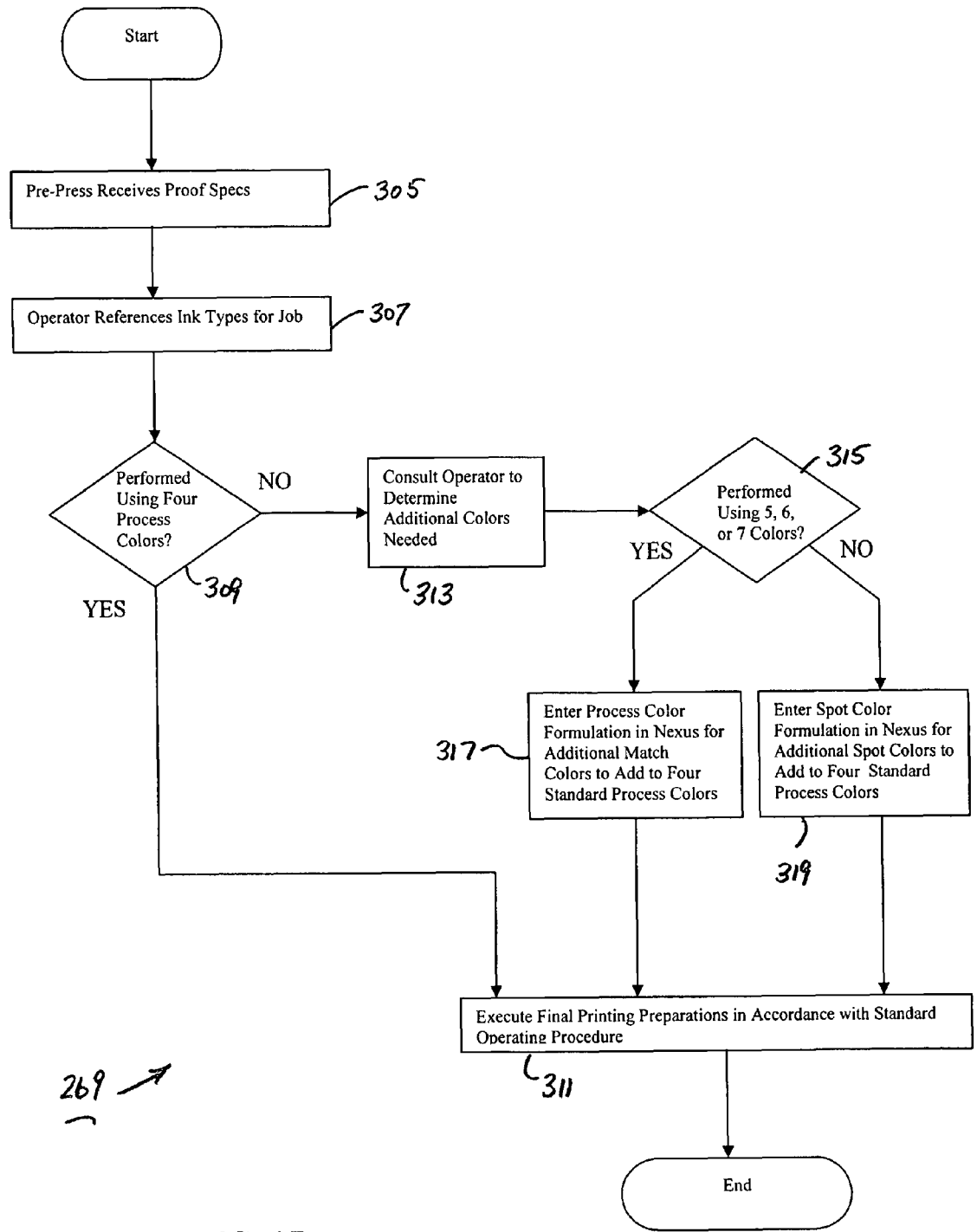
FIG. 17 is a flow chart depicting in greater detail the color formulation process referenced in FIG. 14.

Referring now to FIG. 17, there is shown a flow chart which depicts in greater detail color formulation process 269 for the digital press that is to be used to generate the physical ticket proof (i.e., whether the digital press can print the ticket file by process colors, solids or a combination thereof). In the first step of color formulation process 269, the pre-press operator receives the digital press proof job jacket and production folder from scheduling (i.e., GPD), said receiving step being identified generally by reference numeral 305. In response thereto, the pre-press operator references the ink types required for the particular job item indicated on the production folder, said referencing step being identified generally by reference numeral 307. In particular, the pre-press operator analyzes whether the print job can be effectively printed in process color (i.e., using combinations of cyan, yellow, magenta and black) or in spot color (i.e., using selected individual colors, such as those identified as part of the Pantone Matching System (PMS)).

Based on the analysis performed in step 307, the pre-press operator first decides whether the print job can be printed in spot or process color, said decision step being identified generally by reference numeral 309. It should be noted that the four process colors (i.e., cyan, yellow, magenta and black) are standard colors that are commonly provided on a digital press.

If the print job can be printed in process color, the final printing preparations are undertaken in accordance with standard operating procedure (SOP), said final preparation step being identified generally by reference numeral 311. Stated another way, because the print job can be performed with 100% color accuracy using the four standard colors of the digital press, no adjustments are required to the color palette of the digital press.

To the contrary, if the print job can not be accurately printed in process color, the pre-press operator is consulted to ascertain the types of spot colors that need to be added to the digital press, said consultation step being identified generally by reference numeral 313. Based on the analysis undertaken in step 313, the pre-press operator first decides whether the print job can be printed using 5, 6 or 7 color possibilities, said analysis step being identified generally by reference numeral 315. As can be appreciated, the 5, 6 or 7 color possibilities relates to the four process colors (i.e., CMYK) as well as 1, 2 or 3 additional match colors (e.g., PMS or special match colors).

If it is determined that the print job can be printed using 5, 6 or 7 color possibilities, the pre-press operator enters the particular process color formulation for said additional match colors (i.e., adds selected match colors to the four standard four process colors provided on the digital press) in a pre-press automation workflow server (e.g., Nexus), said entering step being identified generally by reference numeral 317. Once entered, process 253 advances to step 311 where the final printing preparations are made.

If it is determined that the print job can not be printed using 5, 6 or 7 color possibilities, the pre-press operator enters any additional spot colors (e.g., a Pantone Matching System (PMS) or special match color) in the pre-press automation workflow server (e.g., Nexus), said entering step being identified generally by reference numeral 319. As can be appreciated, each additional spot color is then mixed on the digital press. Once mixed, process 269 advances to step 311 where the final printing preparations are made.

It should be noted that process 269 only resorts to color mixing (i.e., step 319) if adequate color matching can not be otherwise accomplished using 4, 5, 6 or 7 color possibilities. Because the mixing of process colors is a time consuming process, it is to be understood that color formulation process 269 purposefully resorts to color mixing as a last resort, which is highly desirable.

Figure 18:
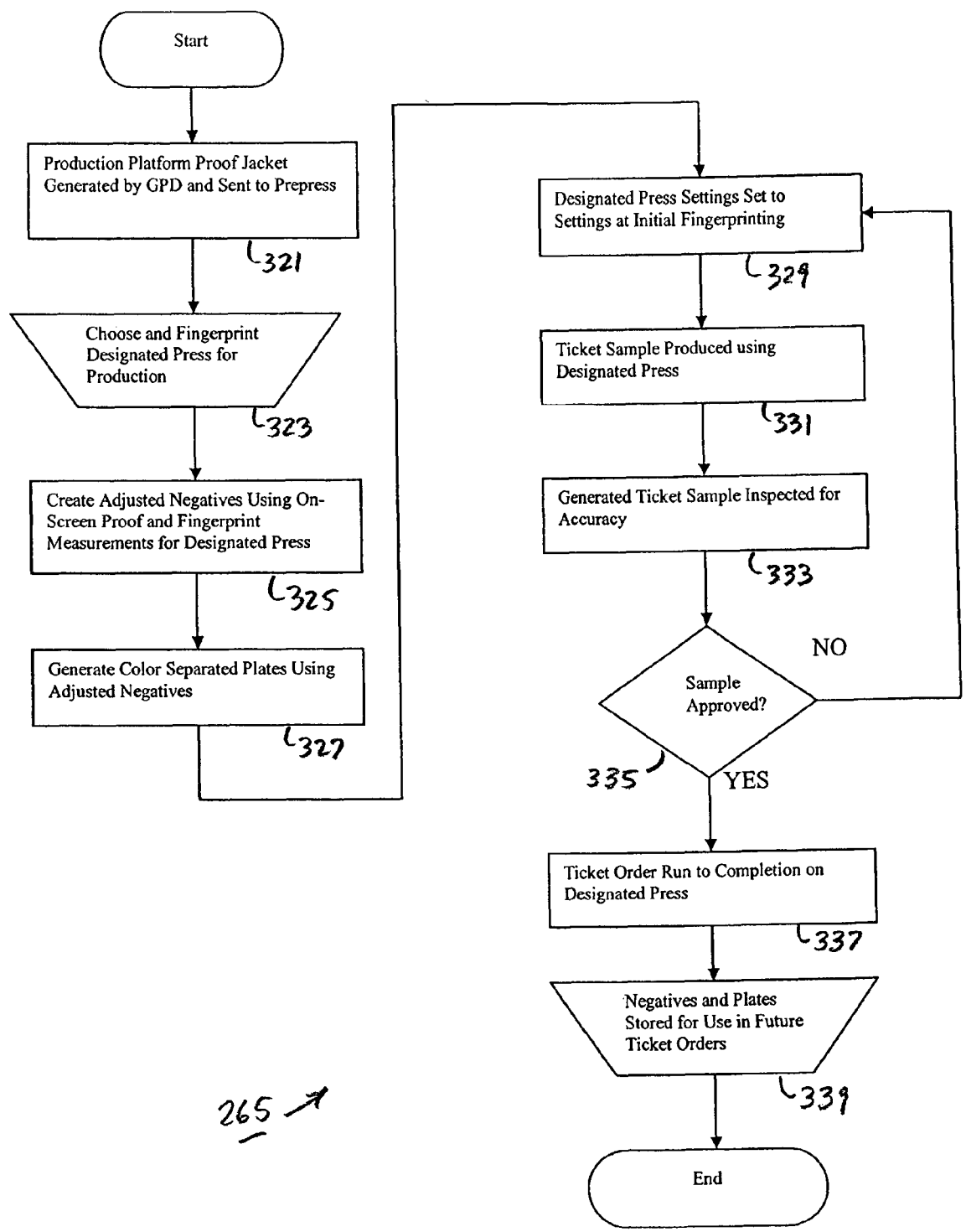
FIG. 18 is a flow chart depicting in greater detail the process by which a ticket proof is printed using the designated press as referenced in FIG. 14.

Referring now to FIG. 18, there is shown in greater detail process 265 for printing a ticket proof using the designated press platform. Specifically, in the first step of process 265, a production platform proof jacket is generated by the Global Product Developer which is in turn sent to prepress, said proof jacket generation step being identified generally by reference numeral 321. At that time, the press is selected at print center 115 and fingerprinted for production, said step being identified generally by reference numeral 323. As defined herein, the term "fingerprinting" relates to a precise method that is used to measure how a particular plate-based press prints, these measurements being traditionally provided by the plate maker for the press. The fingerprinting measurements enable a plate-based press to be adjusted as deemed necessary to match in color with a particular sample.

Upon completion of step 323, adjusted negatives are created using the on-screen ticket proof and the fingerprint measurements for the intended press, said creation step being identified generally by reference numeral 325. In turn, the adjusted negatives are used to generate color separated plates, said plate generation step being identified generally by reference numeral 327.

With the plates having been generated in step 327, the settings for the production press are adjusted to the settings at its initial fingerprinting, said setting step being identified generally by reference numeral 329. At this time, a ticket sample is printed on the designated press, said sample printing step being identified generally by reference numeral 331. The ticket sample is then inspected for accuracy in comparison to, among other things, the on-screen ticket proof and/or customer specifications, said inspection step being identified generally by reference numeral 333.

It is then determined whether the ticket sample is approved, said determination step being identified generally by reference numeral 335.

If the ticket sample is approved, the pending ticket order is run to completion on the designated production press, said step being identified generally by reference numeral 337. Once the ticket order run has been completed, the negatives and plates used by the designated press are stored for use in conjunction with future orders (thereby completing process 265), said storage step being identified generally by reference numeral 339.

If the ticket sample is not approved, process 265 returns to step 329 and the designated press is prepared for re-printing by adjusting its settings back to its specifications at the time of initial fingerprinting.

The embodiment shown in the present invention is intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A method of matching a digital printing press with the color characteristics of a plate-based press platform, the method comprising the steps of:
    (a) calibrating the plate-based press platform to meet Specifications for Web Offset Publications (SWOP) standards,
    (b) creating an International Color Consortium (ICC) profile for the designated plate-based press platform,
    (c) applying the ICC profile to the digital printing press,
    (d) managing the color formulation properties of the digital printing press,
    (e) printing an article with a specified set of print colors using the digital printing press, and
    (f) between the applying and managing steps, printing a first sample using the digital printing press, printing a second sample using the plate-based press platform, and visually inspecting the first sample against the second sample to ensure adequate color matching, wherein, if the first sample fails to adequately match the colors of the second sample, the article printing step is performed using the designated plate-based press platform in place of the digital printing press.

2. The method of claim 1 wherein the calibration step comprises:
    (a) creating a calibration test,
    (b) calibrating the digital printing press to meet a particular printing standard, the calibration of the digital printing press yielding digital press calibration test files which include a first compensation curve,
    (c) imaging the digital press calibration test files onto a first set of printing plates for the plate-based printing platform with the first compensation curve applied,
    (d) printing the calibration test on the plate-based printing platform using the imaged printing plates,
    (e) measuring the dotgain and density of Cyan, Magenta, Yellow, Black (CMYK) utilizing a four color greyramp, and
    (f) comparing the measured dotgain and density of CMYK to SWOP standards.

3. The method of claim 2 wherein the dotgain and density of CMYK is measured at 0%, 25%, 50%, 75% and 100%.

4. The method of claim 3 wherein if the measured dotgain and density of CMYK do not meet SWOP standards, a second compensation curve is created to compensate for the deviation in dotgain and density from SWOP standards.

5. The method of claim 1 wherein the ICC profile creation step comprises:
   (a) printing a profile test swatch using the plate-based press platform,
   (b) creating a profile look-up table for the plate-based press platform using the profile test swatch, and
   (c) incorporating the profile look-up table into the digital printing press so that the digital printing press is configured to replicate the color characteristics of the plate-based press platform.

6. A method of matching a digital printing press with the color characteristics of a plate-based press platform, the method comprising the steps of:
   (a) calibrating the plate-based press platform to meet a particular printing standard, the calibration step comprising the steps of:
      (i) creating a calibration test,
      (ii) calibrating the digital printing press to meet a particular printing standard, the calibration of the digital printing press yielding digital press calibration test files which include a first compensation curve,
      (iii) imaging the digital press calibration test files onto a first set of printing plates for the plate-based printing platform with the first compensation curve applied,
      (iv) printing the calibration test on the plate-based printing platform using the imaged printing plates,
      (v) measuring the dotgain and density of Cyan, Magenta, Yellow, Black (CMYK) at 0%, 25%, 50%, 75% and 100% utilizing a four color greyramp, and
      (vi) comparing the measured dotgain and density of CMYK to SWOP standards, wherein if the measured dotgain and density of CMYK do not meet SWOP standards, a second compensation curve is created to compensate for the deviation in dotgain and density from SWOP standards,
   (b) creating an International Color Consortium (ICC) profile for the designated plate-based press platform,
   (c) applying the ICC profile to the digital printing press,
   (d) managing the color formulation properties of the digital printing press, and
   (e) imaging the digital press calibration test files onto a second set of printing plates for the plate-based printing platform with the first and second compensation curves applied.

7. The method of claim 6 wherein the calibration test comprises:
   (a) a CMYK grey ramp,
   (b) a registration test,
   (c) a density test, and
   (d) selected color gamut tones.

8. A method of matching a digital printing press with the color characteristics of a plate-based press platform, the method comprising the steps of:
   (a) calibrating the plate-based press platform to meet a particular printing standard,
   (b) creating an International Color Consortium (ICC) profile for the designated plate-based press platform,
   (c) applying the ICC profile to the digital printing press,
   (d) managing the color formulation properties of the digital printing press, the managing step comprising the steps of:
      (i) analyzing whether the set of print colors for the article can be accurately matched in color by the digital printing press using only four process colors,
      (ii) if accurately matched, printing the set of print colors for the article by the digital printing press using only four process colors, and
      (iii) if inaccurately matched, determining which colors in addition to the four process colors need to be added to the digital printing press to accurately match the print colors for the article, and
   (e) printing an article with a specified set of print colors using the digital printing press.

9. The method of claim 8 wherein the four process colors are cyan, magenta, yellow and black.

10. The method of claim 8 wherein the step of determining which colors in addition to the four process colors need to be added to the digital printing press comprises:
   (a) analyzing whether the set of print colors for the article can be accurately matched in color by the digital printing press using only four process colors and at most three match colors,
   (b) if accurately matched, printing the set of print colors for the article by the digital printing press using only four process colors and at most three match colors, and
   (c) if inaccurately matched, printing the set of print colors for the article by the digital printing press using four process colors and at least one spot color.

* * * * *